US012587083B2

(12) United States Patent
Brambilla et al.

(10) Patent No.: US 12,587,083 B2
(45) Date of Patent: Mar. 24, 2026

(54) INTERNAL RAMP COMPENSATION FOR CONSTANT ON-TIME BUCK CONVERTER

(71) Applicant: STMicroelectronics International N.V., Geneva (CH)

(72) Inventors: Niccolo' Brambilla, San Donato Milanese (IT); Stefano Corona, Borgarello (IT); Sandro Rossi, Pavia (IT); Valeria Bottarel, Novara (IT); Fulvio Ottavio Lissoni, Cusago (IT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 259 days.

(21) Appl. No.: 18/334,708

(22) Filed: Jun. 14, 2023

(65) Prior Publication Data

US 2024/0421708 A1 Dec. 19, 2024

(51) Int. Cl.
H02M 1/00 (2007.01)
H02M 3/158 (2006.01)

(52) U.S. Cl.
CPC ......... H02M 1/0025 (2021.05); H02M 3/158 (2013.01)

(58) Field of Classification Search
CPC .... H02M 3/156; H02M 3/158; H02M 3/1566; H02M 3/1588; H02M 1/0025
See application file for complete search history.

(56) References Cited

U.S. PATENT DOCUMENTS

| | | | | |
|---|---|---|---|---|
| 9,184,659 B2 * | 11/2015 | Song | ........................ | H02M 3/156 |
| 9,647,552 B2 * | 5/2017 | Li | ........................ | H02M 3/158 |

| | | | | |
|---|---|---|---|---|
| 10,333,403 B2 | 6/2019 | Huang et al. | | |
| 10,340,797 B2 * | 7/2019 | Nogawa | ................ | H02M 3/157 |
| 10,594,209 B2 * | 3/2020 | Chen | ..................... | H02M 3/158 |
| 11,095,221 B1 | 8/2021 | Hsu | | |

(Continued)

FOREIGN PATENT DOCUMENTS

CN          114785123 A          7/2022

OTHER PUBLICATIONS

Yan et al., "Modeling and Design Optimization of Capacitor Current Ramp Compensated Constant On-time V2 Control," IEEE Transactions on Power Electronics, DOI:10.1109/TPEL.2017.2766259, Oct. 2017, 24 pages.

*Primary Examiner* — Gustavo A Rosario-Benitez
(74) *Attorney, Agent, or Firm* — Slater Matsil, LLP

(57) ABSTRACT

An integrated circuit device includes: one or more switches of a Buck converter; and a control circuit for the Buck converter including: a comparator configured to generate a comparator output signal by comparing a feedback voltage of the Buck converter with a compensation ramp voltage; a pulse generator configured to generate, in response to a rising edge in the comparator output signal, a pulse signal for controlling the Buck converter; a transconductance amplifier configured to generate, at an output terminal of the transconductance amplifier, a current proportional to a difference between a reference voltage and the feedback voltage; a capacitor coupled between the output terminal of the transconductance amplifier and a reference voltage node; and a ramp signal generator configured to generate the compensation ramp voltage by adding a voltage at the output terminal of the transconductance amplifier and a ramp voltage generated by the ramp signal generator.

16 Claims, 19 Drawing Sheets

(56) References Cited

U.S. PATENT DOCUMENTS

| | | | |
|---|---|---|---|
| 2002/0125872 A1* | 9/2002 | Groom ................. | H02M 3/156 |
| | | | 323/288 |
| 2010/0033153 A1* | 2/2010 | Xing .................... | H02M 3/156 |
| | | | 323/288 |
| 2012/0081094 A1 | 4/2012 | Luo et al. | |
| 2015/0069982 A1* | 3/2015 | Ouyang ............... | H02M 3/156 |
| | | | 323/234 |
| 2016/0126852 A1 | 5/2016 | Freeman et al. | |
| 2017/0229965 A1 | 8/2017 | Parto | |
| 2017/0288537 A1* | 10/2017 | Jing ........................ | H02M 1/15 |
| 2018/0004240 A1* | 1/2018 | Gritti ........................ | G05F 3/26 |
| 2022/0385177 A1 | 12/2022 | Delepaut et al. | |
| 2023/0031749 A1* | 2/2023 | Chakraborty .......... | H03K 3/037 |
| 2023/0421062 A1* | 12/2023 | Yu ......................... | H02M 3/158 |
| 2024/0258915 A1* | 8/2024 | Tennant ................ | H02M 3/156 |
| 2024/0339929 A1* | 10/2024 | Li ........................... | H02M 1/08 |

* cited by examiner

| $t_x$ | $F_{SW}$ [KHz] | $T_{SW}$ [μs] | $S_x$ [KV/s] | $V_{RAMP\_EQ}$ [mV] |
|-------|----------------|---------------|--------------|---------------------|
| t10   | 100            | 10            | 2            | 20                  |
| t9    | 200            | 5             | 4            | 20                  |
| t8    | 300            | 3.33          | 6            | 20                  |
| t7    | 400            | 2.5           | 8            | 20                  |
| t6    | 500            | 2             | 10           | 20                  |
| t5    | 600            | 1.67          | 12           | 20                  |
| t4    | 700            | 1.42          | 14           | 20                  |
| t3    | 800            | 1.25          | 16           | 20                  |
| t2    | 900            | 1.11          | 18           | 20                  |
| t1    | 1000           | 1             | 20           | 20                  |

Fig. 5

| $t_x$ | $F_{SW}$ [KHz] | Solution 1 | | Solution 2 | | Solution 3 | |
|---|---|---|---|---|---|---|---|
| | | $S_x$ [kV/s] | $V_{RAMP\_EQ}$ [mV] | $G_S$ [kV/s] | $V_{RAMP\_EQ}$ [mV] | $G_S$ [kV/s] | $V_{RAMP\_EQ}$ [mV] |
| t10 | 100 | 1.64 | 16 | 2 | 20 | 2 | 20 |
| t9 | 200 | 5.73 | 29 | 9.75 | 48 | 4 | 20 |
| t8 | 300 | 8.69 | 29 | 12 | 41 | 6 | 20 |
| t7 | 400 | 10.71 | 27 | 13.6 | 34 | 8 | 20 |
| t6 | 500 | 12.13 | 24 | 14.4 | 29 | 10 | 20 |
| t5 | 600 | 13.18 | 22 | 15 | 25 | 12 | 20 |
| t4 | 700 | 13.99 | 20 | 15.3 | 22 | 14 | 20 |
| t3 | 800 | 14.63 | 18 | 15.6 | 19.5 | 16 | 20 |
| t2 | 900 | 15.15 | 17 | 15.8 | 17.5 | 18 | 20 |
| t1 | 1000 | 15.58 | 16 | 16 | 16 | 20 | 20 |
| Final ramp value @s10 [mV] | | 80mV | | 97.5mV | | 60mV | |

Fig. 13

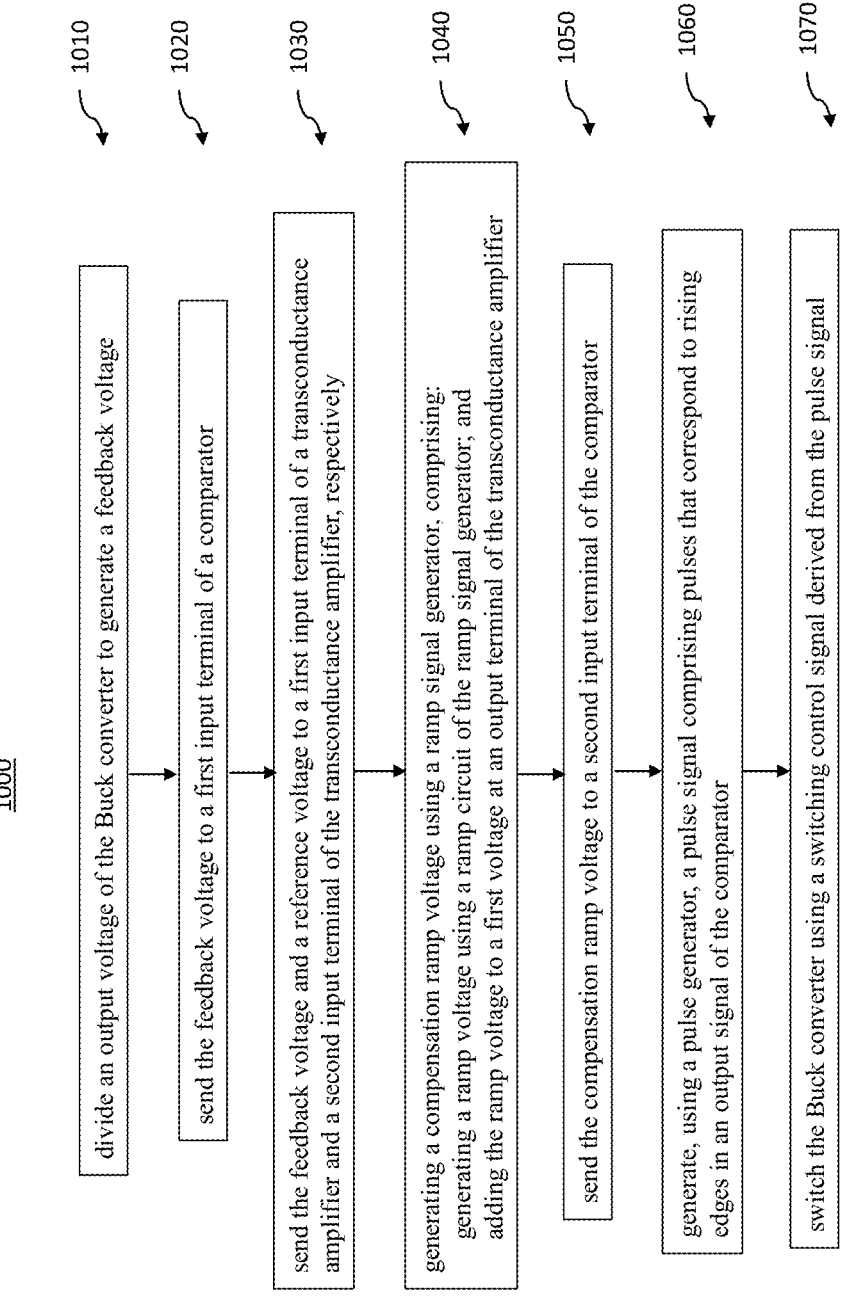

1000

1010 — divide an output voltage of the Buck converter to generate a feedback voltage 1020 — send the feedback voltage to a first input terminal of a comparator 1030 — send the feedback voltage and a reference voltage to a first input terminal of a transconductance amplifier and a second input terminal of the transconductance amplifier, respectively 1040 — generating a compensation ramp voltage using a ramp signal generator, comprising: generating a ramp voltage using a ramp circuit of the ramp signal generator; and adding the ramp voltage to a first voltage at an output terminal of the transconductance amplifier 1050 — send the compensation ramp voltage to a second input terminal of the comparator 1060 — generate, using a pulse generator, a pulse signal comprising pulses that correspond to rising edges in an output signal of the comparator 1070 — switch the Buck converter using a switching control signal derived from the pulse signal

Fig. 16

INTERNAL RAMP COMPENSATION FOR CONSTANT ON-TIME BUCK CONVERTER

TECHNICAL FIELD

The present invention relates generally to switched-mode power supply (SMPS), and in particular embodiments, to Constant On-Time (COT) Buck converters with internal ramp compensation.

BACKGROUND

Power converters are pervasive in many electronic applications from computers to automobiles. In some embodiments, voltages within a power converter are generated by performing a DC-DC, DC-AC, and/or AC-DC conversion by operating a switch loaded with an inductor or transformer. Examples of power converters include switched mode power supplies (SMPS) and linear regulators. An SMPS is usually more efficient than other types of power conversion systems because power conversion is performed by controlled charging and discharging of the inductor or transformer and reduces energy lost due to power dissipation across resistive voltage drops.

An SMPS usually includes at least one switch (also referred to as a power switch) and an inductor or transformer. Some specific topologies include Buck converters, boost converters, and flyback converters, among others. A control circuit is commonly used to open and close the switches to charge and discharge the inductor. In some applications, the current supplied to the load and/or the voltage supplied to the load is controlled via a feedback loop. In some typologies, the switches used in the SMPS are implemented using cascode switches. Linear regulator is another class of power converter where a pass transistor is controlled (e.g., turned on and off) by a controller to provide a steady voltage to an external load.

Buck converter is a popular choice of SMPS and is often used to provide power for a downstream device such as a sensor or a processor. Constant On-Time (COT) control for DC-DC converters allows for fast transient response, but may require careful compensation design. The stability of COT Buck converters is usually addressed with ripple injection strategies using external components, e.g., Equivalent Serial Resistor (ESR), or Time Constant Matching Filter (TCMF). However, using ESR lowers the efficiency of the Buck converter, and the high number of bulky external components used in TCMF is undesirable for customers in terms of cost, complexity, and space required. There is a need in the art for a control circuit that can be integrated with the Buck converter in a same integrated circuit (IC) device, and requires little or no external components.

SUMMARY

In accordance with an embodiment, a switched-mode power supply (SMPS) includes: a Buck converter; and a control circuit for the Buck converter, comprising: a comparator configured to compare a feedback voltage of the Buck converter with a compensation ramp voltage; a pulse generator coupled to an output terminal of the comparator and configured to generate a pulse signal in response to a rising edge in an output signal of the comparator; a logic circuit coupled to an output terminal of the pulse generator and configured to generate, based on the pulse signal, a switching control signal that controls switching of the Buck converter; a transconductance amplifier, wherein a first input terminal of the transconductance amplifier is configured to receive the feedback voltage, and a second input terminal of the transconductance amplifier is configured to receive a reference voltage; a first capacitor coupled between an output terminal of the transconductance amplifier and a reference voltage node; and a ramp signal generator configured to generate the compensation ramp voltage by adding a first voltage at the output terminal of the transconductance amplifier and a ramp voltage generated by a ramp circuit of the ramp signal generator.

In accordance with an embodiment, an integrated circuit (IC) device includes: one or more switches of a Buck converter; and a control circuit for the Buck converter, comprising: a comparator configured to generate a comparator output signal by comparing a feedback voltage of the Buck converter with a compensation ramp voltage; a pulse generator configured to generate a pulse signal in response to a rising edge in the comparator output signal, wherein the Buck converter is configured to be controlled by a switching control signal derived from the pulse signal; a transconductance amplifier configured to generate, at an output terminal of the transconductance amplifier, a current proportional to a difference between a reference voltage and the feedback voltage; a first capacitor coupled between the output terminal of the transconductance amplifier and a reference voltage node; and a ramp signal generator configured to generate the compensation ramp voltage by adding a first voltage at the output terminal of the transconductance amplifier and a ramp voltage generated by a ramp circuit of the ramp signal generator.

In accordance with an embodiment, a method of operating a Buck converter includes: dividing an output voltage of the Buck converter to generate a feedback voltage; sending the feedback voltage to a first input terminal of a comparator; sending the feedback voltage and a reference voltage to a first input terminal of a transconductance amplifier and a second input terminal of the transconductance amplifier, respectively; generating a compensation ramp voltage using a ramp signal generator, comprising: generating a ramp voltage using a ramp circuit of the ramp signal generator; and adding the ramp voltage to a first voltage at an output terminal of the transconductance amplifier; sending the compensation ramp voltage to a second input terminal of the comparator; generating, using a pulse generator, a pulse signal comprising pulses that correspond to rising edges in an output signal of the comparator; and switching the Buck converter using a switching control signal derived from the pulse signal.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates the gradient of a compensation ramp voltage at different time instants within a period of the compensation ramp voltage, in an embodiment;

FIG. 13 illustrates a comparison between different compensation ramp voltages generated by the ramp signal generators of FIGS. 9A, 10A, and 11A, in an embodiment;

FIG. 16 illustrates a flow chart of a method of operating a Buck converter, in some embodiments.

DETAILED DESCRIPTION OF ILLUSTRATIVE EXAMPLES

Figure 1:
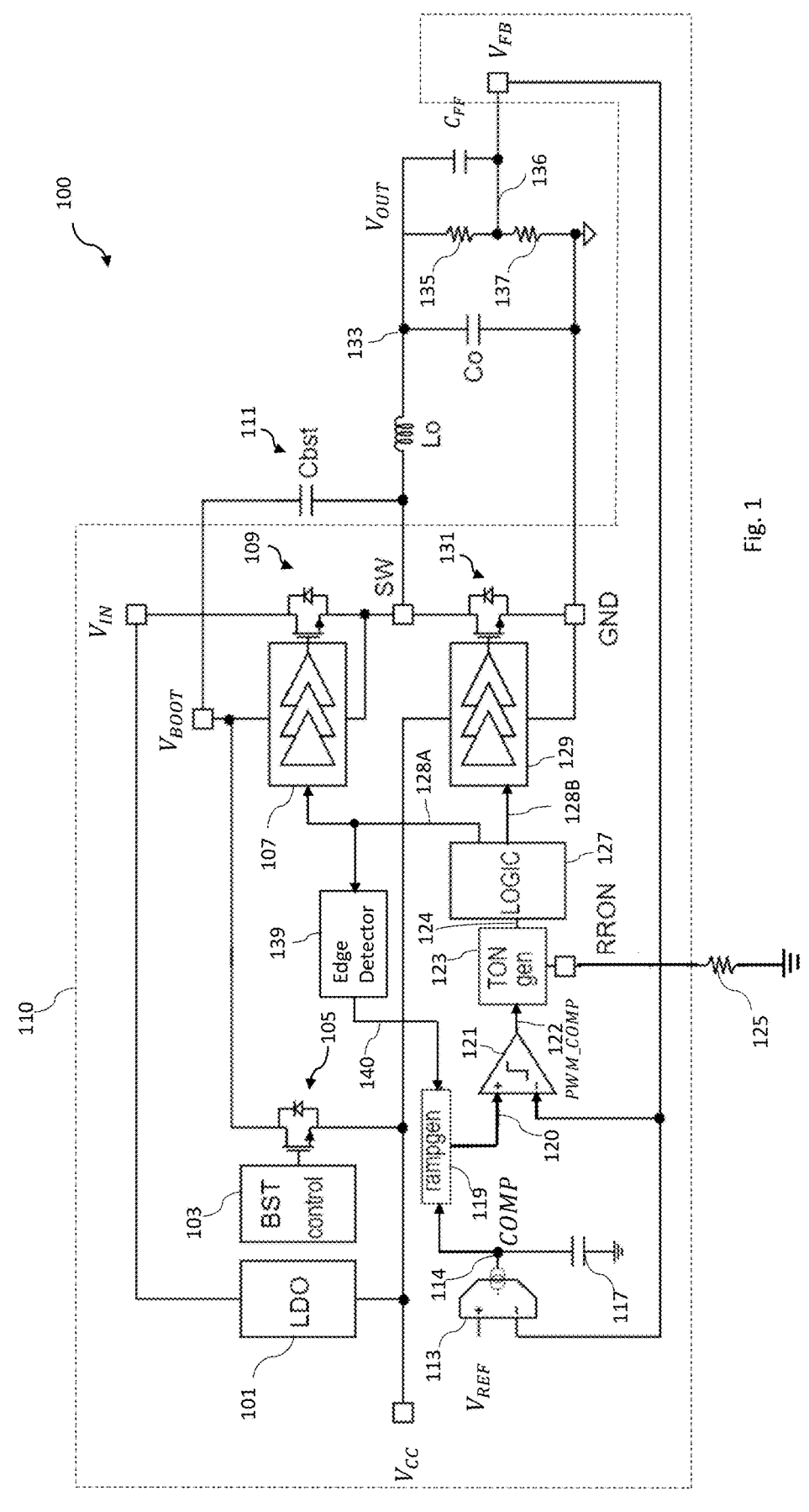
FIG. 1 illustrates a block diagram of a switched-mode power supply (SMPS), in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

The present disclosure will be described with respect to examples in a specific context, namely a COT Buck converter with a control circuit for stability control. Most components of the COT Buck converter and the control circuit are integrated into a same integrated circuit (IC) device, with a few number of components implemented as external components of the IC device, in some embodiments.

FIG. 1 illustrates a block diagram of a switched-mode power supply (SMPS) 100, in an embodiment. Note that for simplicity, not all features of the SMPS 100 are illustrated.

The SMPS 100 in FIG. 1 is a Buck converter with a control circuit that achieves stability control for the Buck converter in a steady state of Buck converter. As will be discussed in more details hereinafter, the Buck converter discussed herein is a COT Buck converter and the control circuit of the Buck converter performs stability compensation through two feedback paths: a fast path that provides a feedback voltage $V_{FB}$ directly to a first input terminal of a pulse-width modulation (PWM) comparator 121, and a slow path that achieves better accuracy by providing a new set point (e.g., a voltage COMP) for the PWM comparator 121. A ramp signal generator 119 of the control circuit generates a non-linear ramp voltage, adds the non-linear ramp voltage to the voltage COMP to generate a compensation ramp voltage 120, and sends the compensation ramp voltage 120 to a second input terminal of the PWM comparator 121. A pulse generator 123 generates a pulse signal 124 having a fixed pulse width in response to rising edges in an output signal 122 of the PWM comparator 121. The pulse signal 124, or a switching control signal 128 derived from the pulse signal by a logic circuit 127, is used to control switching of the Buck converter.

In the example of FIG. 1, components within the dashed box are integrated together on a same semiconductor substrate (e.g., silicon) to form an integrated circuit (IC) device 110 or a portion of an IC device 110. An example of the IC device 110 may be a power-management integrated circuit (PMIC) device. The components outside the dashed box are referred to as external components connected to the IC device 110. The pins of the IC device 110 are illustrated in FIG. 1 as rectangular shaped connectors. As illustrated in FIG. 1, the number of external components needed for the IC device 110 is very small, which advantageously lowers the pin count for the IC device 110.

In FIG. 1, the Buck converter includes a switch 109 (also referred to as a high-side switch), a switch 131 (also referred to as a low-side switch), a gate driver circuit 107 for the switch 109, a gate driver circuit 129 for the switch 131, and a logic circuit 127 for generating the switching control signal 128 (e.g., 128A and 128B) from the pulse signal 124 generated by the pulse generator 123. The Buck converter further includes an inductor $L_O$ and a capacitor $C_O$. In the example of FIG. 1, the switches 109 and 131 are N-type transistors. In another embodiment, the switch 109 is a P-type transistor, and the switch 131 is an N-type transistor. These and other variations are fully intended to be included within the scope of the present disclosure.

The switch 109 is coupled between a pin $V_{IN}$ of the IC device 110 and a pin SW of the IC device 110, and the switch 131 is coupled between the pin SW and a pin GND. The pin $V_{IN}$ is configured to receive a supply voltage (e.g., a voltage between +10V and +100 V), and the pin GND is configured to be connected to a reference voltage (e.g., electrical ground). The inductor $L_O$ is coupled between the pin SW and a node 133, and the capacitor $C_O$ is coupled between the node 133 and the pin GND. During operation of the Buck converter, the voltage at the node 133 is the output voltage $V_{OUT}$ of the Buck converter.

The gate driver circuits 107 and 129 are configured to receive a switching control signal 128A and a switching control signal 128B, respectively, for the Buck converter, and are configured to generates control signals (e.g., gate control signals) for the switches 109 and 131, e.g., by amplifying and/or voltage-shifting the switching control signals 128A and 128B, or by allowing or dis-allowing a voltage source to be applied as the gate-source voltage of a respective transistor 109 or 131. The switches 109 and 131 are transistors, in the illustrated embodiments. In an embodiment where the Buck converter works in a continuous conduction mode, and the switches 109 and 131 are the same type (e.g., N-type) of transistors, the logic circuit 127 generates the switching control signals 128A and 128B with opposite values (e.g., logic HIGH or logic LOW), thereby setting the switches 109 and 131 in opposite states (e.g., ON state or OFF state) during operation of the Buck converter. In other words, for the above example of continuous conduction mode, during operation of the Buck converter, the switch 109 is closed when the switch 131 is open, and switch 109 is open when the switch 131 is closed.

The Buck converter of FIG. 1 further includes a boot-strap capacitor 111, a boot-strap control circuit 103, a switch 105 (e.g., a transistor 105), and a low-dropout (LDO) regulator 101. The boot-strap capacitor 111 is coupled between a pin $V_{BOOT}$ and the pin SW. The load path terminals (e.g., drain terminal and source terminal) of the transistor 105 are coupled between the pin $V_{BOOT}$ and a pin $V_{CC}$. The pin $V_{CC}$ is configured to be coupled to another supply voltage (e.g., a +5V voltage), which is derived from the supply voltage at the pin $V_{IN}$ by the LDO regulator 101 in the example of FIG. 1. Besides the LDO regulator, other types of linear regulators may also be used to generate the supply voltage at the pin $V_{CC}$. In some embodiments, the supply voltage at the pin $V_{CC}$ may be provided by an external voltage source outside the IC device 110 without using a regulator inside the IC device 110. During operation of the Buck converter, when the switch 109 (e.g., an N-type transistor) needs to be closed (e.g., needs to turn the transistor 109 ON), the boot-strap control circuit 103 turns off the switch 105, and the voltage across the boot-strap capacitor 111 (provided by the charge stored in the boot-strap capacitor 111) provides a gate-source voltage of, e.g., +5V, for the transistor 109 to turn ON the transistor 109. When the voltage at the pin SW is low (e.g., the corresponding voltage at the pin $V_{BOOT}$ is equal to or lower than the voltage at the pin $V_{CC}$) after the switch 109 is open (e.g., the transistor 109 turned OFF), the boot-strap control circuit 103 turns on the transistor 105, such that the supply voltage at the pin $V_{CC}$ charges the boot-strap capacitor 111 (e.g., to restore the +5V voltage across the boot-strap capacitor 111). The capacitance of the boot-strap capacitor 111 may be large, thus an external capacitor is used as the boot-strap capacitor 111, and the pin $V_{BOOT}$ is used to provide an electrical connection between the boot-strap capacitor 111 and the switch 105.

The Buck converter illustrated in FIG. 1 is merely a non-limiting example. Variations are possible and are fully intended to be included within the scope of the present disclosure. For example, the switch 131 in FIG. 1 may be replaced by a diode with its cathode connected to the pin SW and its anode connected to the pin GND.

The control circuit for the Buck converter and the operation of the control circuit are discussed hereinafter. In the illustrated embodiment of FIG. 1, components not belonging to the Buck converter belong to the control circuit.

Still referring to FIG. 1, the output voltage $V_{OUT}$ of the Buck converter is sent to a voltage divider formed by resistors 135 and 137, which are coupled between the node 133 and a reference node connected to a reference voltage (e.g., electrical ground). The output of the voltage divider, referred to as a feedback voltage 136, is sent to the pin $V_{FB}$ of the IC device 110. In the example of FIG. 1, a feedforward capacitor $C_{FF}$ is coupled between the node 113 and the pin $V_{FB}$. The feedforward capacitor $C_{FF}$ may be used to stabilize the system over a wide number of applicative points in terms of output voltage and frequency. In some embodiments, the feedforward capacitor $C_{FF}$ is omitted.

As illustrated in FIG. 1, the feedback voltage 136 is sent to an inverting input terminal of the PWM comparator 121 (also referred to as a comparator 121), and sent to an inverting input terminal of a transconductance amplifier 113. A reference voltage $V_{REF}$ is supplied to a non-inverting input terminal of the transconductance amplifier 113. The reference voltage $V_{REF}$ may be derived from an internal voltage of the IC device 110, and used for setting the target output voltage or the feedback voltage of the Buck converter, in some embodiments.

The transconductance amplifier 113 generates, at an output terminal 114 of the transconductance amplifier 113, an output current that is proportional to a difference between the reference voltage $V_{REF}$ and the feedback voltage 136. A capacitor 117 is coupled between the output terminal 114 and a reference voltage node (e.g., electrical ground). In some embodiments, the output current of the transconductance amplifier 113 charges the capacitor 117 and generates a voltage COMP at the output terminal 114.

The voltage COMP is sent to the ramp signal generator 119. In addition, a control signal 140, which is generated by an edge detector 139, is also sent to the ramp signal generator 119. In an embodiment, the edge detector 139 is a rising edge detector, which generates a narrow pulse (e.g., having a pulse width between a few nanoseconds and tens of nanoseconds) when a rising edge in the switching control signal 128A is detected. In other words, the edge detector 139 generates a narrow pulse in the control signal 140 in response to a rising edge in the switching control signal 128A, such that the narrow pulse occurs at the rising edge of the switching control signal 128A. The narrow pulses in the control signal 140 may be used as a reset signal for the ramp signal generator 119 and other circuits of the IC device 110.

The ramp signal generator 119 generates a non-linear ramp voltage, and adds the non-linear ramp voltage to the voltage COMP to generate the compensation ramp voltage 120 at its output terminal. The compensation ramp voltage 120 is sent to a non-inverting input terminal of the comparator 121 in the example of FIG. 1. Details of the non-linear ramp voltage and different embodiments of the ramp signal generator 119 are discussed hereinafter.

The comparator 121 compares the compensation ramp voltage 120 with the feedback voltage 136, and generates an output signal 122 (also referred to as a PWM_COMP signal). For example, if the compensation ramp voltage 120 is higher than the feedback voltage 136, the output signal 122 has a logic HIGH value; and if the compensation ramp voltage 120 is lower than the feedback voltage 136, the output signal 122 has a logic LOW value.

In the example of FIG. 1, the pulse generator 123 is configured to detect a rising edge in the output signal 122 and generate a pulse in the pulse signal 124 in response to the detection of the rising edge. The pulses in the pulse signal 124 have a fixed pulse width, and are used by the logic circuit 127 to generate the switching control signals 128A and 128B. For example, if the Buck converter works in the continuous conduction mode, then the pulse signal 124 may be passed through the logic circuit 127 and used as the switching control signal 128A, and a complement of the pulse signal 124 (e.g., generated by an inverter in the logic circuit 127) is used as the switching control signal 128B. If the Buck converter works in discontinuous conduction mode, then the logic circuit 127 may include additional circuits for generating the dead time where both switches 109 and 131 are open. In the illustrated embodiments, the pulse width (e.g., duration when the pulse signal 124 has a logic HIGH value) of the pulse signal 124 determines (e.g., equals to) the ON time of the switch 109, and since the pulse width of the pulse signal 124 is constant, the Buck converter discussed herein functions as a Constant On-Time (COT) Buck converter. Note that in FIG. 1, a resistor 125 is coupled to the pin RRON of the IC device 110, and is used to determine the pulse width of the pulse signal 124. Therefore, the pulse generator 123 illustrated in FIG. 1 inside the dashed box corresponds to portions of the pulse generator integrated in the IC device 110, the resistor 125 is part of the pulse generator, but is implemented as an external component.

Figure 2:
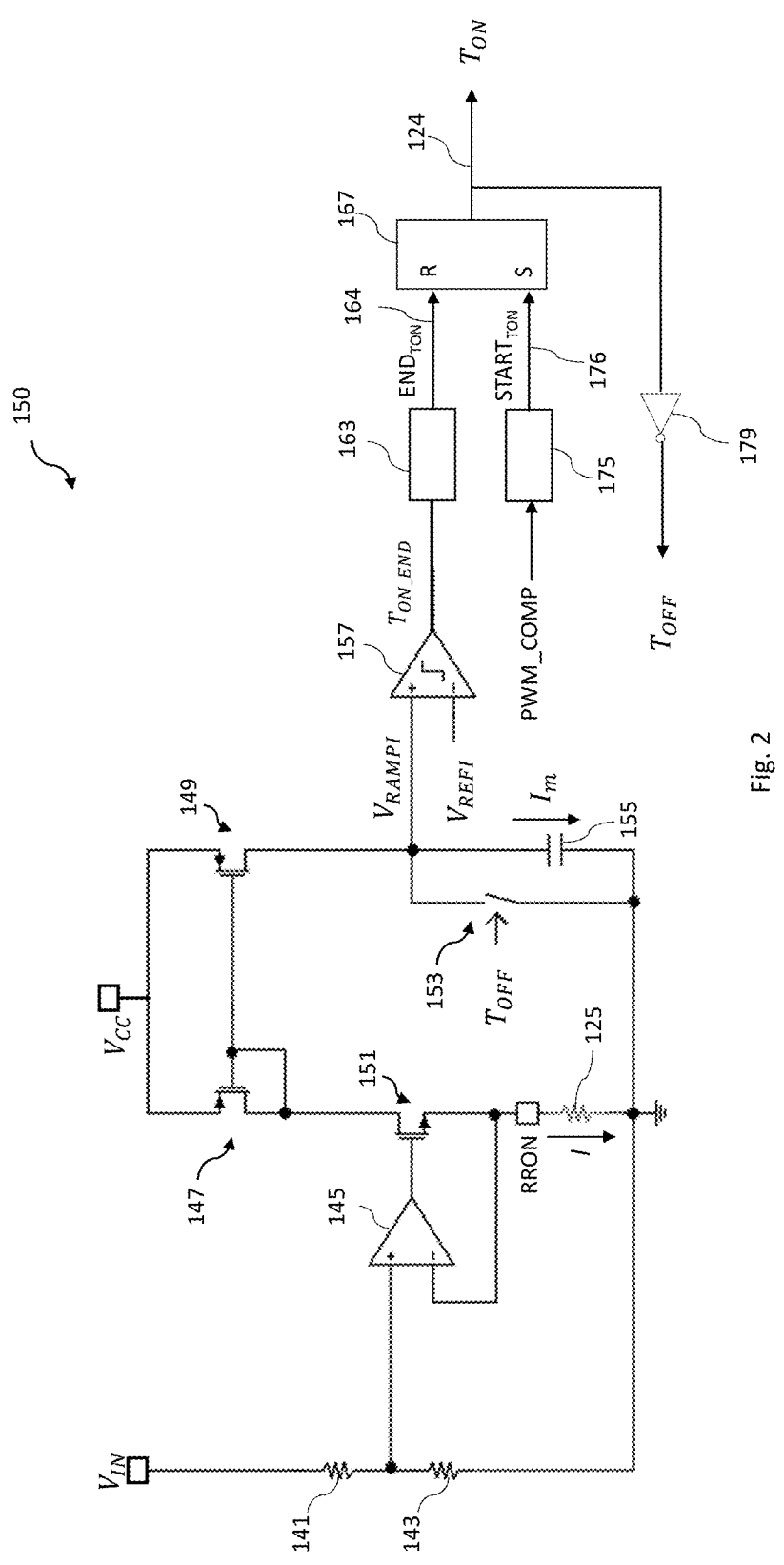
FIG. 2 illustrates a block diagram of a pulse generator, in an embodiment.

FIG. 2 illustrates a block diagram of a pulse generator 150, in an embodiment. The pulse generator 150 may be used as the pulse generator 123 of FIG. 1. Note that the resistor 125 coupled to the pin RRON of the IC device 110 in FIG. 1 is also plotted in FIG. 2.

In FIG. 2, the pulse generator 150 includes an operational amplifier 145. A first input terminal (e.g., a non-inverting input terminal) of the operational amplifier 145 is coupled to an output of a voltage divider formed by resistors 141 and 143. The resistors 141 and 143 are coupled between the pin $V_{IN}$ and a reference voltage node (e.g., electrical ground). The voltage divider provides a scaled version of the voltage at the pin $V_{IN}$, denoted as $K_s \times V_{IN}$, to the first input terminal of the operational amplifier 145, where $K_s$ is a constant scaling factor.

A second input terminal (e.g., an inverting input terminal) of the operational amplifier 145 is coupled to the pin RRON. The voltage at the second input terminal of the operational amplifier 145, which is equal to the voltage at the first input terminal of the operational amplifier 145, generates a current $I = K_s \times V_{IN}/R_{RON}$ that flows through the resistor 125, where $R_{RON}$ is the resistance of the resistor 125. A mirror current $I_m$ is generated by the current mirror circuit (which includes transistors 147 and 149), and charges a capacitor 155 coupled to a non-inverting input terminal of a comparator 157.

A switch 153 is coupled in parallel to the capacitor 155, and is controlled by a control signal $T_{OFF}$. When the control signal $T_{OFF}$ is logic HIGH, the switch 153 is closed to discharge the capacitor 155. When the control signal $T_{OFF}$ is logic LOW, the switch 153 is open, and the mirror current $I_m$ charges the capacitor 155. As a result, the voltage across the capacitor 155, denoted as voltage $V_{RAMPI}$, increases linearly from zero. The comparator 157 compares the voltage $V_{RAMPI}$ with a reference voltage $V_{REFI}$ applied at an inverting input terminal of the comparator 157, and generates an output signal $T_{ON\_END}$. The reference voltage $V_{REFI}$ may be a constant reference voltage generated internally from other supply voltage within the IC device 110.

Still referring to FIG. 2, the output signal $T_{ON\_END}$ of the comparator 157 is sent to an edge detector 163. The edge detector 163 is configured to detect a rising edge in the output signal $T_{ON\_END}$ and generate an output signal 164 (e.g., a short pulse for each rising edge, also referred to as a $END_{TON}$ pulse) that starts at the rising edge of the output signal $T_{ON\_END}$. FIG. 2 also illustrates another edge detector 175. The edge detector 175 is configured to receive the PWM_COMP signal from the comparator 121 of FIG. 1, detect a rising edge in the PWM_COMP signal, and generate an output signal 176 (e.g., a short pulse for each rising edge, also referred to as a $START_{TON}$ pulse) that starts at the rising edge of the PWM_COMP signal. Each $START_{TON}$ pulse and a respective $END_{TON}$ pulse are used to generate a pulse signal, details are discussed below with reference to FIGS. 2 and 3.

In the example of FIG. 2, the output signal 176 (e.g., the $START_{TON}$ pulse) of the edge detector 175 is sent to a SET(S) terminal of a flip-flop 167, and the output signal 164 (e.g., the $END_{TON}$ pulse) of the edge detector 163 is sent to a RESET (R) terminal of the flip-flop 167. The flip-flop 167 may be, e.g., a Set-Reset (SR) latch that is formed by a pair of cross-coupled NOR gates. In some embodiments, the pulse signal 124 of the flip-flop 167 maintains its current value when the SET terminal and the RESET terminal are in the logic LOW state (e.g., signals at the SET and RESET terminals have the logic LOW value). If the SET terminal is pulsed high while the RESET terminal is held low, then the pulse signal 124 is forced high, and stays high when the SET terminal returns to low; similarly, if the RESET is pulsed high while the SET terminal is held low, then the pulse signal 124 is forced low, and stays low when the RESET terminal returns to low. The pulse signal 124 may also be referred to as a $T_{ON}$ signal, and the $T_{OFF}$ signal is generated by inverting the $T_{ON}$ signal using an inverter 179.

Figure 3:
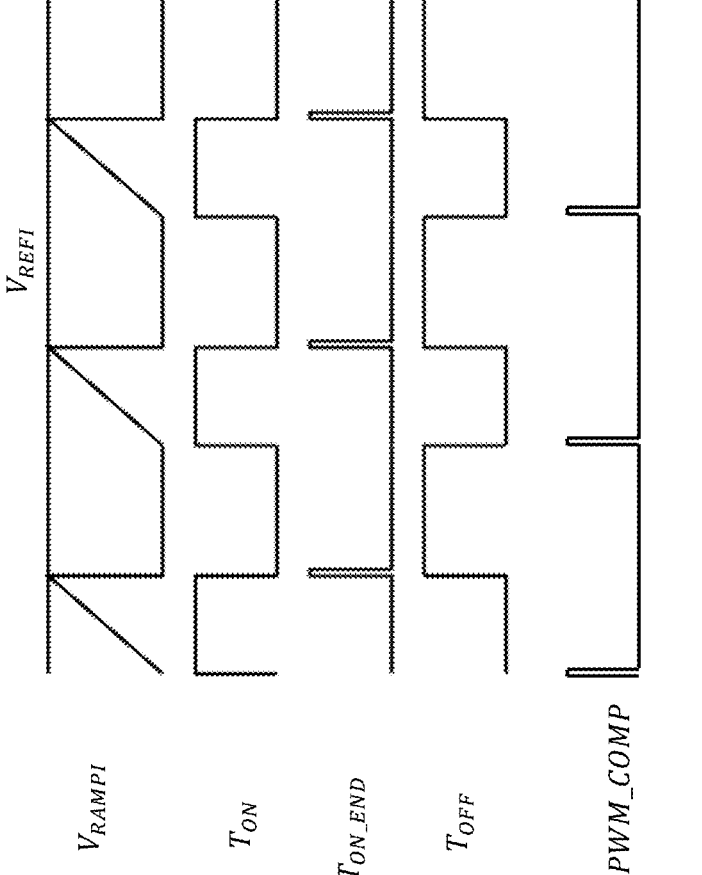
FIG. 3 illustrates a timing diagram for the pulse generator of FIG. 2, in an embodiment.

FIG. 3 illustrates a timing diagram for the pulse generator of FIG. 2, in an embodiment. As illustrated in FIG. 3, the pulse width of the $T_{ON}$ signal is determined by the time it takes for the voltage across the capacitor 155 in FIG. 2 to increase linearly from zero to the voltage $V_{REFI}$. In other words, how quickly the capacitor 155 is charged by the mirror current $I_m$ determines the pulse width of the $T_{ON}$ signal. One skilled in the art will readily appreciate that given the capacitance of the capacitor 155, the pulse width of the $T_{ON}$ signal is adjustable by adjusting the resistance $R_{RON}$ of the resistor 125. A larger resistance for the resistor 125 results in a smaller mirror current $I_m$ and a larger pulse width for the $T_{ON}$ signal, and conversely, a smaller resistance for the resistor 125 results in a larger mirror current $I_m$ and a smaller pulse width for the $T_{ON}$ signal, in some embodiments.

In order to achieve stability of the Buck converter, the control circuit for the Buck converter may need information regarding the output voltage of the Buck converter and/or the switching frequency of the Buck converter. The switching frequency of the Buck converter is the frequency at which the switch 109 is turned ON and OFF during operation, in some embodiments. The switching frequency of the Buck converter may be calculated as $$\frac{1}{P_{TON} + P_{TOFF}},$$

where $P_{TON}$ is the duration of a positive pulse in the $T_{ON}$ signal (see, e.g., FIG. 3), and $P_{TOFF}$ is the duration of a positive pulse in the $T_{OFF}$ signal (see, e.g., FIG. 3). However, the output voltage of the Buck converter and the switching frequency of the Buck converter may not be readily available for the control circuit. In addition, for the design of IC device 110, it is advantageous to keep the number of pins of the IC device 110 low to keep the design simple and cost effective. Therefore, it may be advantageous to design the control circuit that could receive combined information regarding the output voltage and switching frequency of the Buck converter using less pins. In some embodiments, the resistance $R_{RON}$ of the resistor 125 in FIG. 1 is given by:

$$R_{RON} = \frac{K_{RON} \times V_{OUT}}{f_{SW}} \qquad (1)$$

where $V_{OUT}$ is the target output voltage of the Buck converter in unit of volt, $f_{SW}$ is the target switching frequency of the Buck converter in unit of kHz, $K_{RON}$ is a constant, and $R_{RON}$ is in unit of kΩ. In some embodiments, the resistance $R_{RON}$ is in a range between a few kilo-Ohms to a few hundred kilo-Ohms, and the constant $K_{RON}$ is defined to keep the resistance $R_{RON}$ within this range for all switching frequencies and output voltages within the design specification of the Buck converter. The resistance $R_{RON}$ in Equation (1) determines the pulse width of the $T_{ON}$ signal based on combined information regarding the output voltage and switching frequency of the Buck converter. The choice of resistance $R_{RON}$ of the resistor 125 in Equation (1) reduces the pin count of the IC device 110 while achieving improved stability for the Buck converter.

From the discussion above, skilled artisans will ready appreciate that among other factors, the compensation ramp voltage 120 generated by the ramp signal generator 119 to a large extent determines the switching behavior and performance of the Buck converter. In order to achieve good control of the Buck converter, the compensation ramp voltage 120 should have a large enough amplitude to avoid jitter due to the precision of the comparator 121. In addition, the gradient (also referred to as slope) of the compensation ramp voltage 120 should be in a specific range. In particular, the inventors of this application have found that, given a target output voltage ripple $\Delta V_{OUT}$ (e.g., ripple in the output voltage $V_{OUT}$) of the Buck converter and a target switching frequency $f_x$ of the Buck converter, a gradient $S_x$ (also referred to as a slope) of the compensation ramp voltage 120 is given by:

$$S_x > K \times \frac{\Delta V_{OUT}}{t_x} \qquad (2)$$

where $t_x = 1/f_x$ is the switching period of the Buck converter, and K is a multiplication factor have a value between about 1.5 and about 5. The value of K may be found by, e.g., performing simulation and analysis of the Buck converter. In the illustrate embodiments, the output voltage ripple $\Delta V_{OUT}$ is the same as the feedback voltage ripple $\Delta V_{FB}$ (e.g., ripple in the feedback voltage 136) of the Buck converter, thanks to the feedforward capacitor $C_{FF}$. In other words, $\Delta V_{OUT} = \Delta V_{FB}$ in the illustrated embodiments.

As shown in Equation (2), the needed slope value for the compensation ramp voltage 120 scales with the switching frequency $f_x$ proportionally. However, the switching frequency $f_x$ is not known in the control circuit of FIG. 1. The solution to this challenge is to use an open-loop generated compensation ramp voltage with a slope that changes in time, so that for low steady state switching period (or high switching frequency), the compensation ramp voltage 120 has a higher slope, and for high steady state switching period (or low switching frequency), the compensation ramp voltage 120 has a lower slope.

Figure 4:
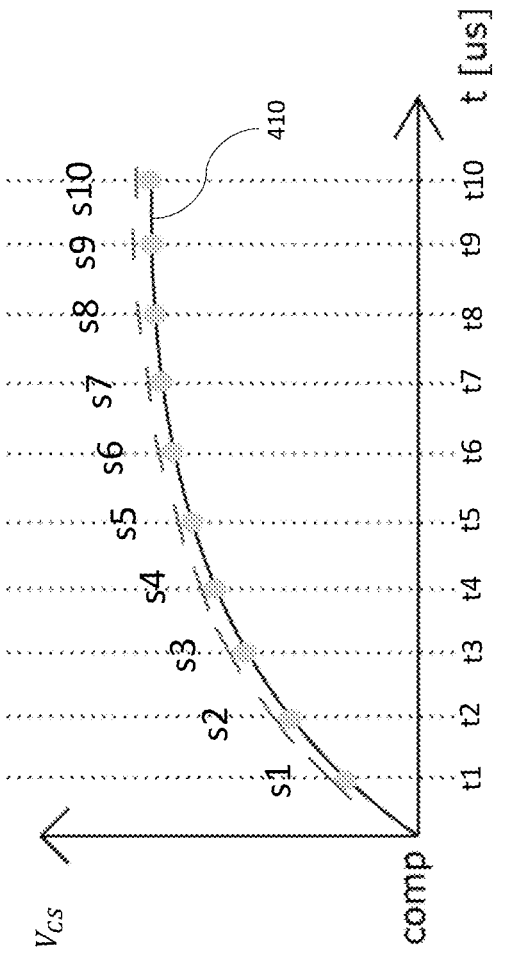
FIG. 4 illustrates a compensation ramp voltage, in an embodiment.

FIG. 4 illustrates a period of a compensation ramp voltage 410, in an embodiment. The compensation ramp voltage 410 may be used as the compensation ramp voltage 120 of FIG. 1. Other examples of the compensation ramp voltage 120 are also possible, and additional examples are discussed hereinafter.

In FIG. 4, the compensation ramp voltage 410 is designed to cover switching period (which is the inverse of switching frequency) in a range from, e.g., $t_1$ to $t_{10}$. For example, at the switching period $t_1$, the slope (or the gradient) of the compensation ramp voltage 410 has a value $S_1$ that satisfies Equation (2), e.g., $$S_1 > K \times \frac{\Delta V_{OUT}}{t_1}.$$

As illustrated in FIG. 4, the compensation ramp voltage 410 is a non-linear voltage signal, and the gradient (or slope) of the non-linear voltage signal decreases continuously from the beginning of the non-linear voltage signal to the end of the non-linear voltage signal.

In FIG. 4, the x-axis shows values of time, where each value of time corresponds to a switching period of the Buck converter. For example, the time instant $t_1$ corresponds to a switching period $t_1$ (or equivalently, a switching frequency $1/t_1$) of the Buck converter. The y-axis shows the value of the compensation ramp voltage 410. The line segments at switching period $t_1$ to $t_{10}$ illustrate the corresponding gradients (or slopes) at those switching periods. In some embodiments, during steady state operation of the Buck converter, the voltage COMP at the output terminal 114 in FIG. 1 is quasi-static (e.g., changing very slowly), such that in tens of, hundreds of, or more switching periods of the Buck converter, the voltage COMP can be treated as if it has a constant value. In some embodiments, the voltage COMP has a quasi-static value of zero in steady state of the Buck converter. Therefore, in FIG. 4, the compensation ramp voltage 410 is shown as a ramp voltage added on top of a (constant) voltage COMP, this is because the ramp signal generator 119 generates the compensation ramp voltage (e.g., 120 in FIG. 1) by adding a ramp voltage to the voltage COMP. Various embodiments of ramp signal generator 119 for generating various examples of the compensation ramp voltage 120 are discussed hereinafter.

The compensation ramp voltage 410 shown in FIG. 4 illustrates a complete period of the designed compensation ramp voltage. If during the stead state of the Buck converter, the Buck converter switches at the switching frequency $1/t_{10}$ (or equivalently, having a switching period $t_{10}$), then the compensation ramp voltage 120 generated by the ramp signal generator 119 includes repeated complete copies of the compensation ramp voltage 410 (see, e.g., $V_{RAMP}$ in FIG. 6A). However, if during the stead state of the Buck converter, the Buck converter switches at a switching frequency higher than $1/t_{10}$, such as switching at a switching frequency of $1/t_5$ (or equivalently, having a switching period $t_5$), then the compensation ramp voltage 120 generated by the ramp signal generator 119 includes repeated partial copies of the compensation ramp voltage 410 (see, e.g., $V_{RAMP}$ in FIG. 6B), wherein each partial copy includes portions of the compensation ramp voltage 410 up to the switching period $t_5$. Therefore, for the example of FIG. 4, the switching period of the Buck converter is equal to or less than $t_{10}$, and depending on the switching frequency of Buck converter, the ramp signal generator 119 is configured to generate complete copies of the compensation ramp voltage 410, or partial copies (e.g., comprising early portions of the compensation ramp voltage 410 up to time instant $t_x$, $x < 10$).

FIG. 5 illustrates the gradient of a compensation ramp voltage at different time instants within a period of the compensation ramp voltage of FIG. 4, in an embodiment. The first column of the table in FIG. 5 shows the time instants $t_x$ (e.g., $t_1$ to $t_{10}$) within a period of the compensation ramp voltage. The second column and the third column show the corresponding switching frequency and the switching period at the time instants ty. The fourth column shows the slope $S_x$ of the compensation ramp voltage at the corresponding time instant $t_x$. The fifth column shows the equivalent ramp amplitude for each switching frequency at a respective time instant $t_x$, where the equivalent ramp amplitude represents the final ramp value that would be achieved by the compensation ramp voltage, if the compensation ramp voltage were a linear voltage signal with a slope $S_x$ that starts from time zero and ends at the time instant $t_x$. Notably, the example in FIG. 5 have the same equivalent ramp amplitude for all switching frequencies.

Figures 6A, 6B:
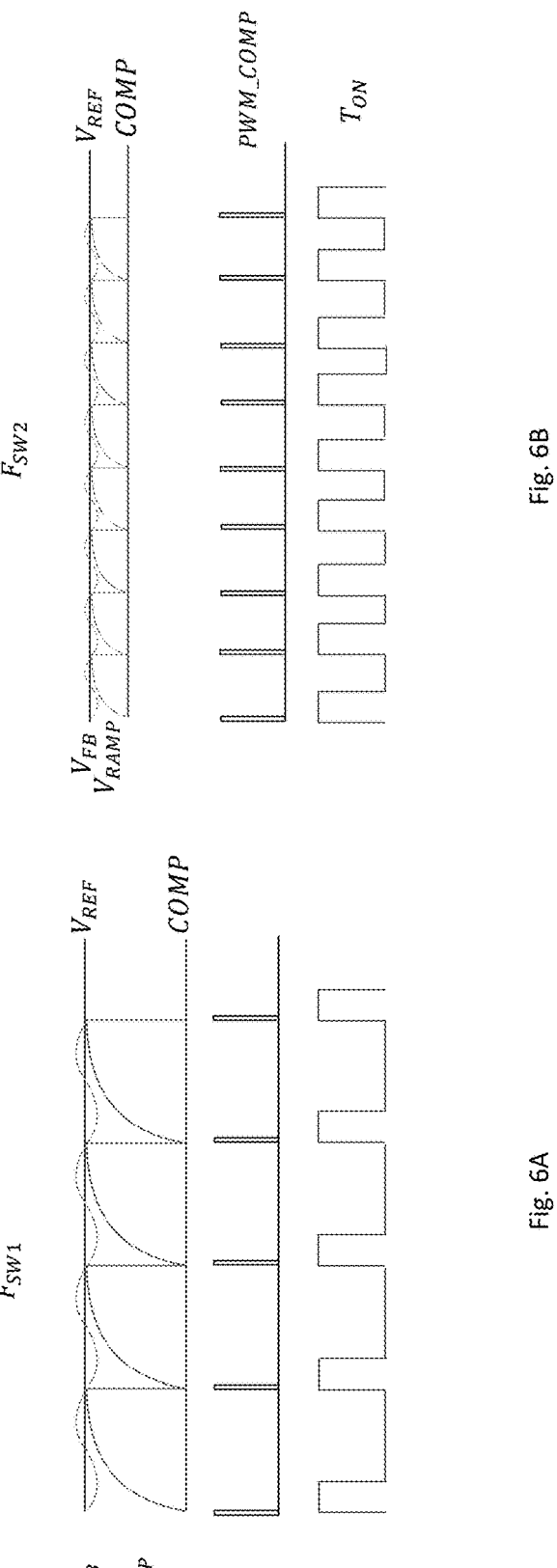
FIGS. 6A and 6B illustrate timing diagrams of the Constant On-Time (COT) Buck converter of FIG. 1 at two different switching frequencies, in an embodiment.

FIGS. 6A and 6B illustrate timing diagrams of the COT Buck converter of FIG. 1 at two different switching frequencies, in an embodiment. FIG. 6A shows the Buck converter switching at a low switching frequency (e.g., $1/t_{10}$), and FIG. 6B shows the Buck converter switching at a higher switching frequency (e.g., $1/t_5$).

In FIG. 6A, the voltage COMP is illustrated as a constant voltage. The ramp voltage $V_{RAMP}$ is generated by the ramp signal generator 119 (see FIG. 1) and added on top of the voltage COMP to form the compensation ramp voltage 120. For ease of discussion, the voltage COMP may be considered as zero, so the ramp voltage $V_{RAMP}$ is considered the same as the compensation ramp voltage 120. The sine wave shaped curve in FIG. 6A illustrates the feedback voltage $V_{FB}$, which oscillates around the constant reference voltage $V_{REF}$. Note that the feedback voltage $V_{FB}$ is illustrated as a sine wave shaped curve for illustration purpose only, the actual shape of the feedback voltage $V_{FB}$ may not be a sine wave. Referring to FIG. 6A and FIG. 1, when the rising ramp voltage $V_{RAMP}$ reaches a same value as the feedback voltage $V_{FB}$, the PWM_COMP signal at the output of the comparator 121 turns to logic HIGH. In response to the rising edge of the PWM_COMP signal, the pulse generator 123 generates a pulse in the $T_{ON}$ signal (e.g., pulse signal 124). The $T_{ON}$ signal is used by the logic circuit 127 to generate the switching control signals 128A and 128B for switching the switches 109 and 131 of the Buck converter. A rising edge in the switching control signal 128A is detected by the edge detector 139 to generate a narrow pulse in the control signal 140. As will be discussed in more details, the narrow pulse in the control signal 140 resets the ramp voltage $V_{RAMP}$ to zero. As a result, the PWM_COMP signal turns to logic LOW, and the ramp voltage $V_{RAMP}$ starts to increase from zero again, and the process discussed above repeats again.

FIG. 6B is similar to FIG. 6A, but the Buck converter switches at a higher switching frequency. As illustrated in FIG. 6B, due to the higher switching frequency, the ramp voltage $V_{RAMP}$ generated by the ramp signal generator 119 is a smaller, earlier portion of the compensation ramp voltage 410 in FIG. 4 (e.g., a portion up to time instant $t_5$), whereas the ramp voltage $V_{RAMP}$ generated by the ramp signal generator 119 in FIG. 6A may be the complete period of the compensation ramp voltage 410 (e.g., the whole compensation ramp voltage 410 up to time instant $t_{10}$).

Figure 7B:
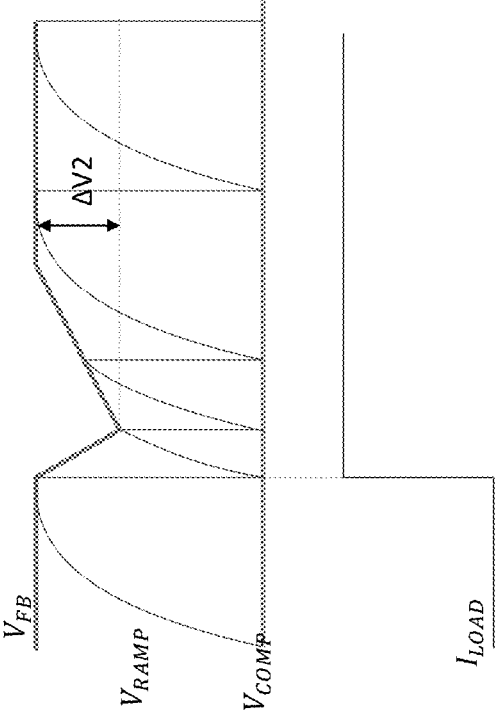
FIGS. 7A and 7B illustrate the transient response of the COT Buck converter of FIG. 1 with two different compensation ramp voltages, in an embodiment.
Figure 7A:
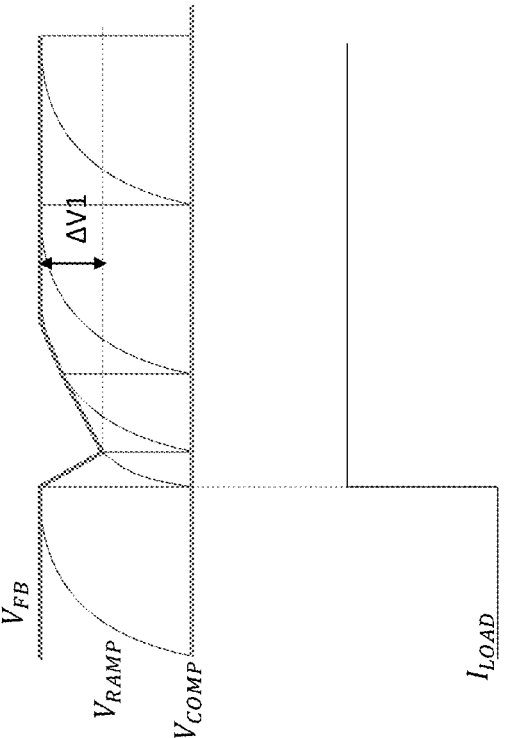

FIGS. 7A and 7B illustrate the transient response of the COT Buck converter of FIG. 1 with two different compensation ramp voltages, in an embodiment. For the results shown in FIGS. 7A and 7B, the ramp signal generator 119 generates a first compensation ramp voltage and a second compensation ramp voltage, respectively, where the first compensation ramp voltage has lower gradients at various time instants (e.g., $t_1$ to $t_{10}$ in FIG. 4) than the second compensation ramp voltage. As a result, the value of the first compensation ramp voltage at different time instants is lower than the second compensation ramp voltage. Note that while the first compensation ramp voltage and the second compensation ramp voltage have different gradients and values at the same time instants, the gradients of the first compensation ramp voltage and the second compensation ramp voltage both satisfy Equation (2).

In FIGS. 7A and 7B, when there is a sudden load increase, indicated by a step increase in the load current $I_{LOAD}$, the feedback voltage $V_{FB}$ (which is a scaled version of the output voltage of the Buck converter) also drops suddenly as a result. The control circuit of the Buck converter adjusts the switching frequency of the Buck converter during a transient response period to restore the output voltage of the Buck converter to the target value. The voltage drop $\Delta V1$ (e.g., the maximum voltage drop) during the transient response in FIG. 7A is smaller than the voltage drop $\Delta V2$ (e.g., the maximum voltage drop) during the transient response in FIG. 7B. Therefore, it is seen from FIGS. 7A and 7B that in order to reduce the voltage drop during a transient response, it may be advantageous to design the compensation ramp voltage such that the gradients of the compensation ramp voltage at various switching periods (e.g., $t_1$ to $t_{10}$ in FIG. 4) have the minimum allowed values (or the compensation ramp voltage has the minimum allowed voltage values at the various switching periods), as along as the gradients satisfy Equation (2) to ensure stability of the Buck converter.

Figure 8:
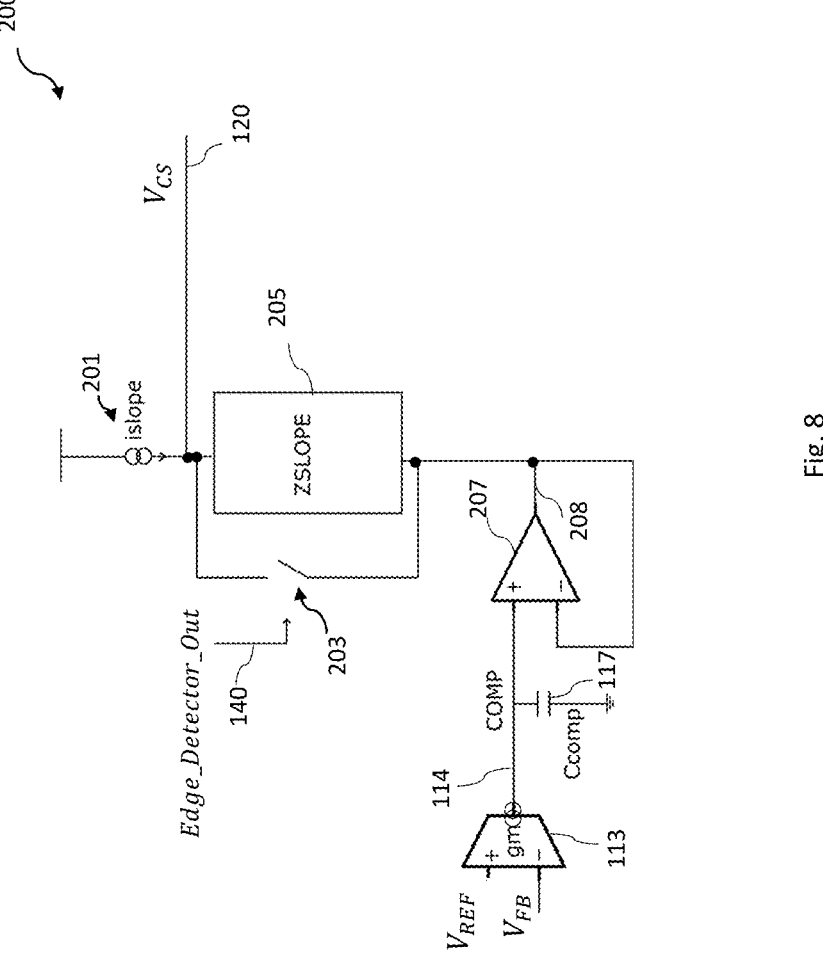
FIG. 8 illustrates a generic block diagram of a ramp signal generator, in an embodiment.

FIG. 8 illustrates a generic block diagram of a ramp signal generator 200, in an embodiment. The ramp signal generator 200 may be used as the ramp signal generator 119 of FIG. 1. Note that to show the electrical connection of the ramp signal generator 200, the transconductance amplifier 113 and the capacitor 117 in FIG. 1 are also shown in FIG. 8, with the understanding that the transconductance amplifier 113 and the capacitor 117 are not part of the ramp signal generator 200.

In FIG. 8, the ramp signal generator 200 includes an operation amplifier 207, a current source 201, a ramp circuit 205, and a switch 203 coupled in parallel to the ramp circuit 205. The ramp circuit 205 is configured to generate a voltage signal in response to the current signal provided by the current source 201. As will be discussed in more details later, the ramp circuit 205 generates a non-linear ramp voltage, which is added to the voltage COMP at the output terminal 114 of the transconductance amplifier 113 to form the compensation ramp voltage 120. Various embodiments of the ramp circuit 205 are discussed hereinafter with reference to FIGS. 9A-9B, 10A-10B, and 11A-11B.

As illustrated in FIG. 8, a non-inverting input terminal of the operational amplifier 207 is coupled to the output terminal 114 of the transconductance amplifier 113, and an inverting input terminal of the operational amplifier 207 is coupled to an output terminal 208 of the operational amplifier 207. The ramp circuit 205 is coupled between an output terminal of the current source 201 and the output terminal 208 of the operational amplifier 207. The switch 203 is coupled in parallel to the ramp circuit 205, and is controlled by the control signal 140 generated by the edge detector 139 in FIG. 1. In some embodiments, the switch 203 is closed when the control signal 140 has a logic HIGH value, and is open when the control signal 140 has a logic LOW value. The switch 203 is used to reset the non-linear ramp voltage generated by the ramp circuit 205.

Figure 9A:
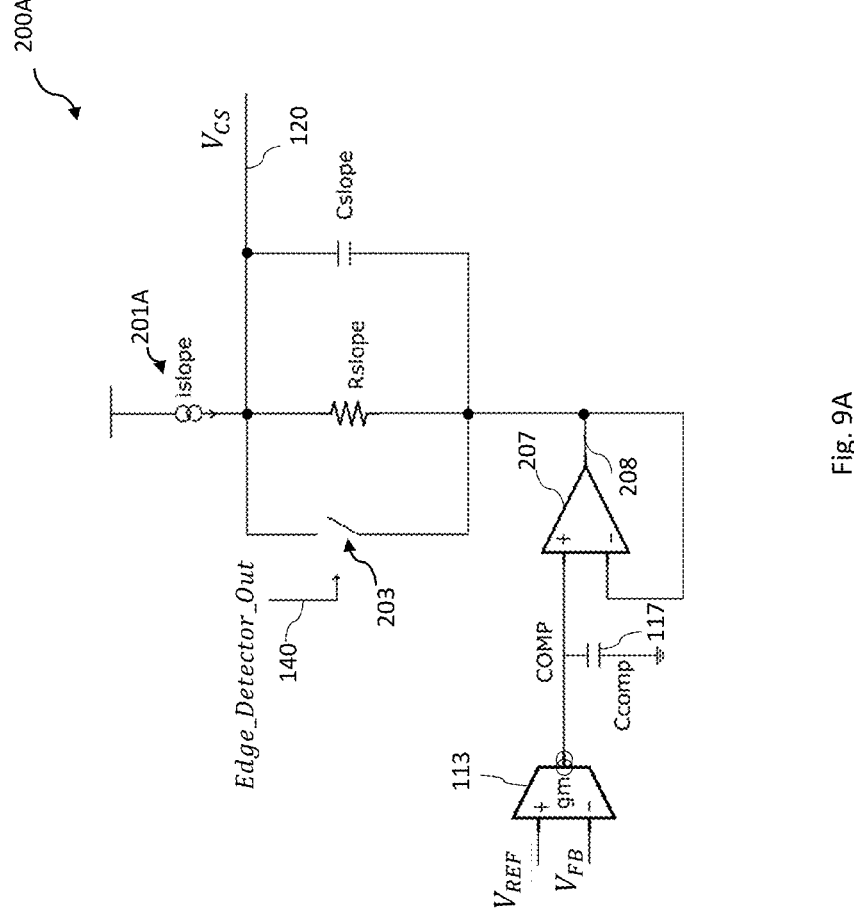
FIGS. 9A and 9B illustrate a block diagram of a ramp signal generator and the corresponding compensation ramp voltage generated by the ramp signal generator, respectively, in an embodiment.
Figure 9B:
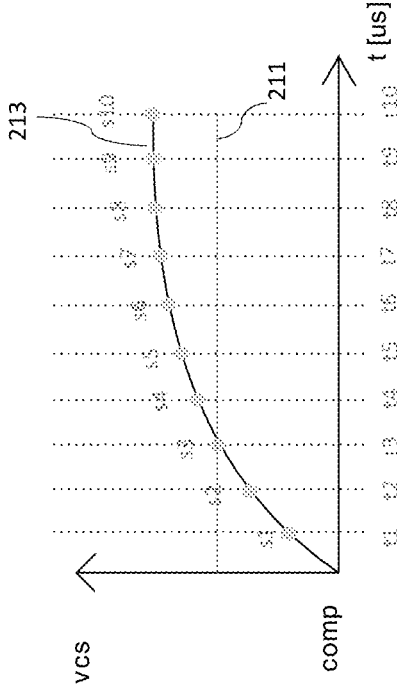

FIGS. 9A and 9B illustrate a block diagram of a ramp signal generator 200A and the corresponding compensation ramp voltage generated by the ramp signal generator 200A, respectively, in an embodiment. FIG. 9A is similar to FIG. 8, but with a current source 201A replacing the generic current source 201 in FIG. 8, and with an RC filter (comprising a resistor $R_{slope}$ and a capacitor $C_{slope}$) replacing the ramp circuit 205 in FIG. 8.

In the example of FIG. 9A, the current source 201A provides a current $I_{slope}$ having a constant value. When the switch 203 is closed by the control signal 140, the capacitor $C_{slope}$ is discharged, and the ramp voltage is reset to zero. When the switch 203 is open, a portion of the current $I_{slope}$ charges the capacitor $C_{slope}$, and the voltage $V_{ramp}$ across the capacitor $C_{slope}$ (which is the ramp voltage $V_{ramp}$ generated by the ramp circuit) is given by:

$$V_{ramp} = Vramp_f \times \left(1 - e^{-\frac{t}{\tau}}\right) \qquad (3)$$

where $\tau=C_{slope}\times R_{slope}$, and $Vramp_f=I_{slope}\times R_{slope}$. Note that in the equations above, $I_{slope}$, $R_{slope}$, and $C_{slope}$ are used to represent the value of the current $I_{slope}$, the resistance of the resistor $R_{slope}$, and the capacitance of the capacitor $C_{slope}$, respectively. Equation (3) shows that the compensation ramp voltage 120 generated by the ramp signal generator 200A has an exponential shape.

The gradient $S_x$ of the ramp voltage $V_{ramp}$ in Equation (3) at time instant $t_x$ is given by:

$$S_x = \frac{Vramp_f}{\tau} \times e^{\frac{t_x}{\tau}} \qquad (4)$$

Note that since the voltage COMP is quasi-static, the gradient of the ramp voltage $V_{ramp}$ is the same as the gradient of the compensation ramp voltage 120.

In FIG. 9B, the curve 211 shows the value of the current source 201A, and the curve 213 shows the compensation ramp voltage 120 as a ramp voltage added on top of the (constant) voltage COMP.

Figure 10A:
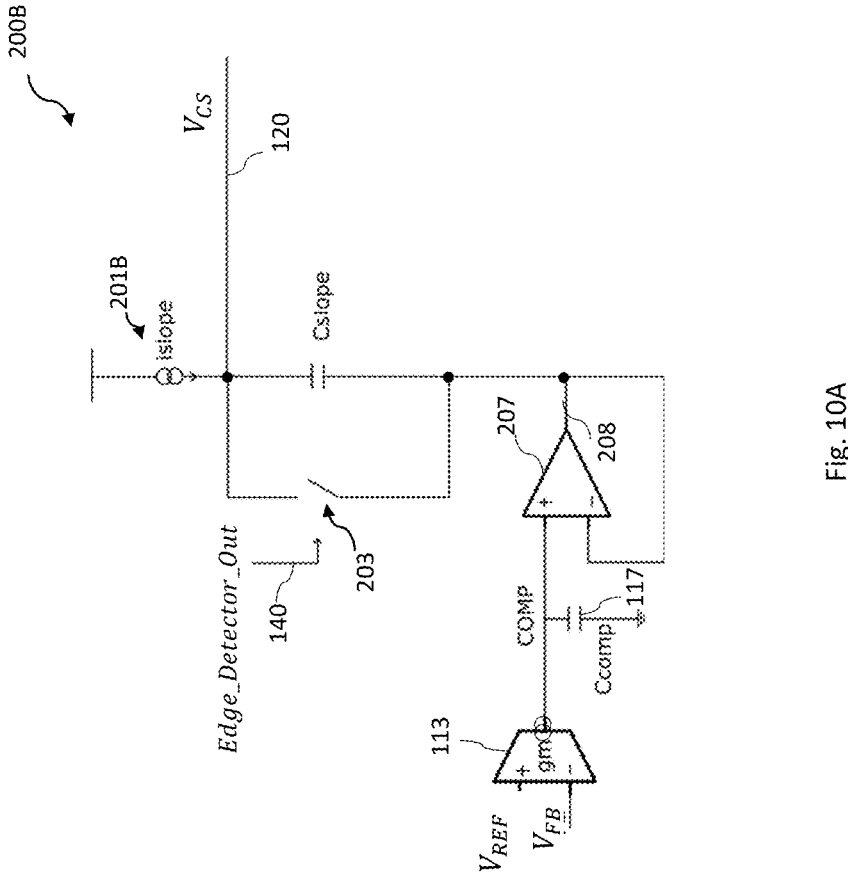
FIGS. 10A and 10B illustrate a block diagram of a ramp signal generator and the corresponding compensation ramp voltage generated by the ramp signal generator, respectively, in another embodiment.
Figure 10B:
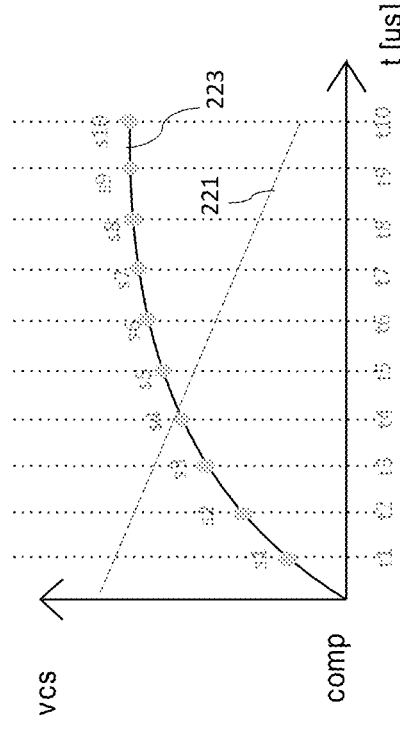

FIGS. 10A and 10B illustrate a block diagram of a ramp signal generator 200B and the corresponding compensation ramp voltage generated by the ramp signal generator 200B, respectively, in another embodiment. FIG. 10A is similar to FIG. 8, but with a current source 201B replacing the generic current source 201 in FIG. 8, and with a capacitor $C_{slope}$ replacing the ramp circuit 205 in FIG. 8.

In the example of FIG. 10A, the current source 201B provides a current $I_{slope}$ having a constant gradient (e.g., a negative gradient) value. In other words, the current source 201B provides a linear current signal having a constant gradient. When the switch 203 is closed by the control signal 140, the capacitor $C_{slope}$ is discharged, and the ramp voltage $V_{ramp}$ is reset to zero. When the switch 203 is open, the current $I_{slope}$ charges the capacitor $C_{slope}$, and the voltage $V_{ramp}$ across the capacitor $C_{slope}$ (which is the ramp voltage $V_{ramp}$ generated by the ramp circuit) is given by:

$$V_{ramp} = \frac{1}{C_{slope}} \int_0^t I_{slope} dt = \frac{1}{C_{slope}} \times \left(\frac{A}{2} \times t^2 + B \times t\right) \qquad (5)$$

where $I_{slope}=A\times t+B$, A and B are constant values, and A has a negative value. Note that in the equations above, $I_{slope}$ and $C_{slope}$ are used to represent the value of the current $I_{slope}$ and the capacitance of the capacitor $C_{slope}$, respectively. Equation (5) shows that the compensation ramp voltage 120 generated by the ramp signal generator 200B has a parabolic shape.

The gradient $S_x$ of the ramp voltage $V_{ramp}$ in Equation (5) at time instant ty is given by:

$$S_x = \frac{A \times t_x + B}{C_{slope}} \qquad (6)$$

In FIG. 10B, the curve 221 shows the value of the current source 201B, and the curve 223 shows the compensation ramp voltage 120 as a ramp voltage added on top of the (constant) voltage COMP.

Figure 11A:
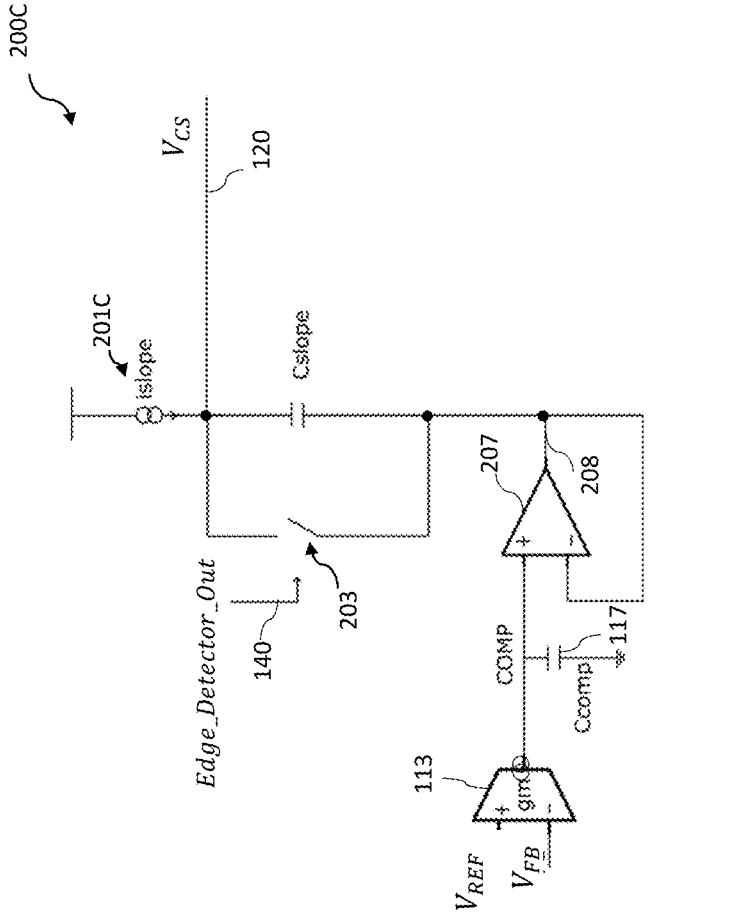
FIGS. 11A and 11B illustrate a block diagram of a ramp signal generator and the corresponding compensation ramp voltage generated by the ramp signal generator, respectively, in yet another embodiment.
Figure 11B:
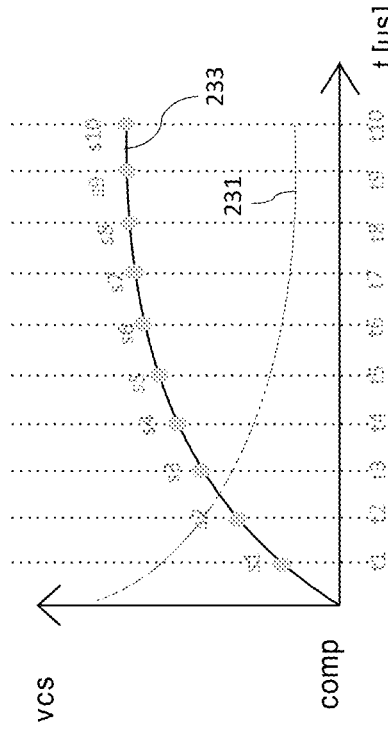

FIGS. 11A and 11B illustrate a block diagram of a ramp signal generator 200C and the corresponding compensation ramp voltage generated by the ramp signal generator 200C, respectively, in yet another embodiment. FIG. 11A is similar to FIG. 8, but with a current source 201C replacing the generic current source 201 in FIG. 8, and with a capacitor $C_{slope}$ replacing the ramp circuit 205 in FIG. 8.

In the example of FIG. 11A, the current source 201C provides a current $I_{slope}$ having a hyperbola shape. When the switch 203 is closed by the control signal 140, the capacitor $C_{slope}$ is discharged, and the ramp voltage $V_{ramp}$ is reset to zero. When the switch 203 is open, the current $I_{slope}$ charges the capacitor $C_{slope}$, and the voltage $V_{ramp}$ across the capacitor $C_{slope}$ (which is the ramp voltage $V_{ramp}$ generated by the ramp circuit) is given by:

$$V_{ramp} = \frac{1}{C_{slope}} \int_0^t I_{slope} dt = \frac{I_{const}^2}{C_{slope}} \times \frac{1}{A} \times \ln(A \times t + B) \qquad (7)$$

where $$I_{slope} = \frac{I_{const}^2}{A \times t + B},$$

$I_{const}$, A, and B are constant values. Note that in the equations above, $I_{slope}$ and $C_{slope}$ are used to represent the value of the current $I_{slope}$ and the capacitance of the capacitor $C_{slope}$, respectively. Equation (7) shows that the compensation ramp voltage 120 generated by the ramp signal generator 200C has a logarithm shape.

The gradient $S_x$ of the ramp voltage $V_{ramp}$ in Equation (7) at time instant $t_x$ is given by:

$$s_x = \frac{1}{C_{slope}} \times \frac{I_{const}^2}{A \times t_x + B} \qquad (8)$$

In FIG. 11B, the curve 231 shows the value of the current source 201C, and the curve 233 shows the compensation ramp voltage 120 as a ramp voltage added on top of the (constant) voltage COMP.

Figure 12:
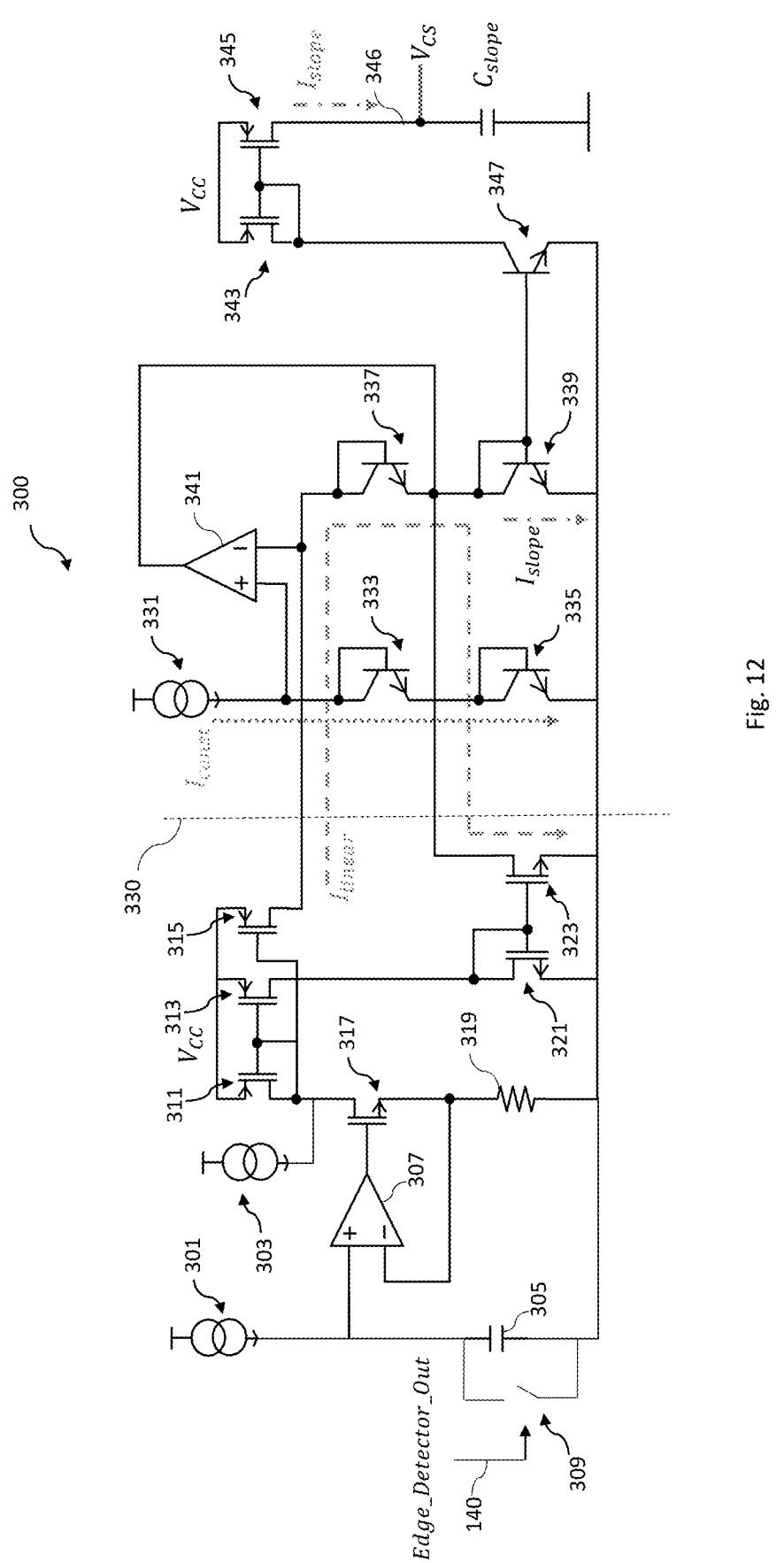
FIG. 12 illustrates a current source for generating a hyperbola shaped supply current, in an embodiment.

FIG. 12 illustrates a current source 300 for generating a supply current having a hyperbola shape, in an embodiment. The current source 300 may be used as the current source 201C in FIG. 11A. Note that to illustrate the electrical connection of the current source 300, the capacitor $C_{slope}$ in FIG. 11A is also illustrated in FIG. 12, with the understanding that the capacitor $C_{slope}$ is not part of the current source 300.

In FIG. 12, the components to the left of the dashed line 330 form a circuit that generates a linear current $I_{linear}$ (e.g., changes linearly over time). For ease of discussion, the circuit to the left of the dashed line that generates the linear current $I_{linear}$ is referred to as a linear current generator. The linear current generator of FIG. 12 includes current sources 301 and 303, each of which generates a constant supply current. When the switch 309 is closed, the constant supply current from the current source 301 charges a capacitor 305 and generates a linear ramp voltage at the non-inverting input terminal of an operational amplifier 307. The inverting input terminal of the operational amplifier 307, which has the same voltage as the non-inverting input terminal, generates a linear current (e.g., increases linearly over time) that flows through a resistor 319. The linear current $I_{linear}$ is generated at the output terminal of a current mirror formed by the transistors 311, 313, and 315, where the linear current $I_{linear}$ is equal to a difference between the constant supply current from the current source 303 and the linear current flowing through the resistor 319.

Still referring to FIG. 12, the linear current $I_{linear}$ flows through a bi-polar transistor 337. A portion of the linear current $I_{linear}$ flows through a transistor 323 to electrical ground, and another portion of the linear current $I_{linear}$, denoted as current $I_{slope}$, flows through a bi-polar transistor 339 to electrical ground. FIG. 12 further illustrates a current source 331 which generates a supply current $I_{const}$ having a constant value. The supply current $I_{const}$ flows through bi-polar transistors 333 and 335 to electrical ground. During operation of the current source 300, the inverting input terminal and the non-inverting input terminal of the operational amplifier 341 have the same voltage. Therefore, based on the way the bi-polar transistors 333, 335, 337, and 339 are connected to the operational amplifier 341, and based on the equal voltages at the two input terminals of the operational amplifier 341, the following voltage relation can be derived:

$$2 \times V_{th} \times \ln\left(\frac{I_{const}}{I_s}\right) = V_{th} \times \ln\left(\frac{I_{slope}}{I_s}\right) + V_{th} \times \ln\left(\frac{I_{linear}}{I_s}\right) \quad (9)$$

where $V_{th} = K \times T/q$ is the thermal voltage of each of the bi-polar transistor 333, 335, 337, and 339, K is the Boltzmann constant, T is the temperature in unit of kelvin, q is the unity charge of electron, and $I_s$ is the reverse saturation current.

From Equation (9), it is straightforward to derive the current $I_{slope}$ flowing through the bi-polar transistor 339 as:

$$I_{slope} = \frac{I_{const}^2}{I_{linear}} \quad (10)$$

The current $I_{slope}$ is mirrored by a current mirror circuit (which includes transistors 343 and 345), and generate a mirrored current $I_{slope}$ at an output terminal 346 of the current source 300. As shown in Equation (10), the current $I_{slope}$ (and the mirrored current $I_{slope}$) has a hyperbola shape.

FIG. 13 illustrates a comparison between different compensation ramp voltages generated by the ramp signal generators of FIGS. 9A, 10A, and 11A, in an embodiment. The Solutions 1, 2, and 3 in FIG. 13 correspond to compensation ramp voltages generated by the ramp signal generators of FIGS. 9A, 10A, and 11A, respectively. As an example, a design target is that the equivalent ramp amplitudes at all switching frequency should be in a range between 15 mV and 50 mV.

In the table of FIG. 13, the first column shows the time instant $t_x$ (which corresponds to a switching period $t_x$, or equivalently, a switching frequency $1/t_x$) within a period of the compensation ramp voltage. The second column shows the switching frequency. For each solution, two columns are shown, one for the gradient of the compensation ramp voltage at the corresponding switching frequency, and one for the equivalent ramp amplitude. It is seen that for all three solutions, the equivalent ramp amplitudes at all switching frequency are within the target range between 15 mV and 50 mV.

The last row of the table in FIG. 13 shows the final ramp value, which is the value of the compensation ramp voltage at, e.g., the time instant $t_{10}$. The third solution has the lowest final ramp value. Recall that in the discussion of FIGS. 7A and 7B, a smaller final ramp value means smaller voltage drop in transient response, thus the Solution 3 gives the best load transient performance for the three solutions illustrated in FIG. 13.

Figure 14B:
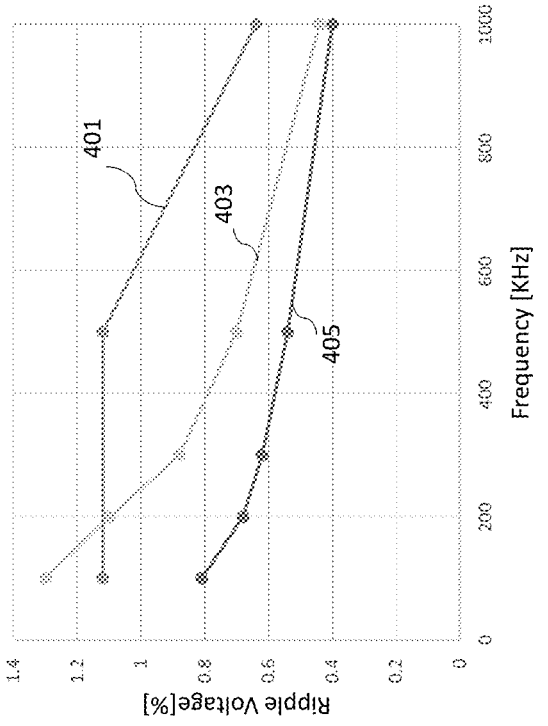
FIGS. 14A and 14B illustrate the performance of the COT Buck converter with different compensation ramp voltages, in some embodiments.
Figure 14B:
Figure 14A:
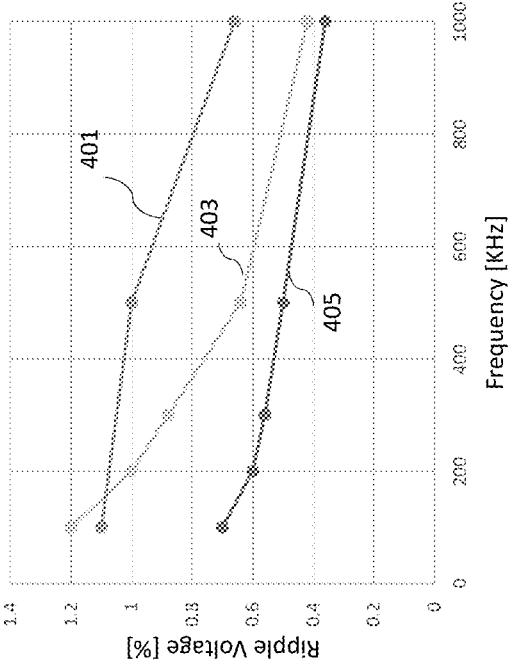

FIGS. 14A and 14B illustrate performance of the COT Buck converter with different compensation ramp voltages, in some embodiments. In FIG. 14A or 14B, curves 401, 403, and 405 illustrate simulated performance of the Buck converter when the compensation ramp voltage is generated by the ramp signal generator of FIGS. 9A, 10A, and 11A, respectively. The x-axis shows the switching frequency of the Buck converter, and the y-axis shows the voltage drop during a load transient, where the voltage drop is represented as a percentage of the output voltage $V_{OUT}$ of the Buck converter. The output voltage $V_{OUT}$ in FIG. 14A is 24 V, and the output voltage $V_{OUT}$ in FIG. 14B is 48 V. In both FIGS. 14A and 14B, a +5 V voltage is applied to the pin $V_{CC}$ by the LDO regulator 101. It is seen from FIGS. 14A and 14B that the curve 405, which corresponds to the ramp signal generator of FIG. 11A, gives the best performance (e.g., smallest voltage drops) among the three curves.

Figure 15:
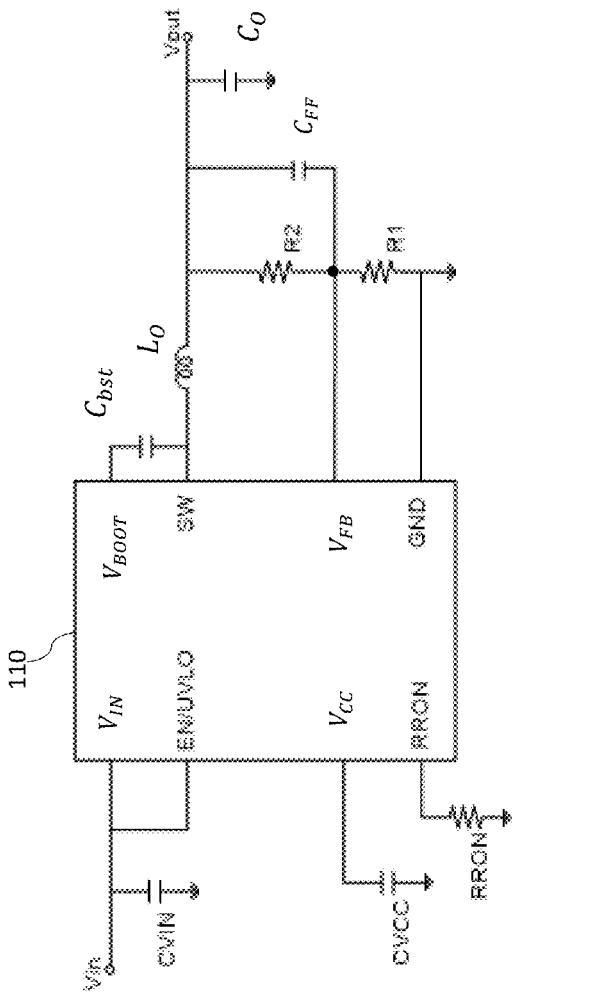
FIG. 15 illustrates the pins of the integrated circuit (IC) device 110 of FIG. 1, in an embodiment.

FIG. 15 illustrates the pins of the integrated circuit (IC) device 110 of FIG. 1, in an embodiment. As illustrated in FIG. 15, the number of pins used for the IC device 110 is very small, e.g., only 8 pins, which reduces the cost of manufacturing and the cost of deploying the IC device 110 in the field. The pins in FIG. 15 match the pins shown in FIG. 1 by the pin names. Note that FIG. 15 illustrates an extra pin (e.g., the enable pin EN/UVLO) than FIG. 1, which enable pin EN/UVLO is used for enabling or disabling the IC device 110. The number of external components needed for the IC device 110 is also very limited, as illustrated in FIG. 15. Two capacitors CVIN and CVCC are used to filter out high frequency component of the supply voltage at pins $V_{in}$ and $V_{cc}$. Other external components are discussed in FIG. 1, thus not discussed here.

FIG. 16 illustrates a flow chart of a method 1000 of operating a Buck converter, in some embodiments. It should be understood that the example method shown in FIG. 16 is merely an example of many possible example methods. One of ordinary skill in the art would recognize many variations, alternatives, and modifications. For example, various steps as illustrated in FIG. 16 may be added, removed, replaced, rearranged, or repeated.

Referring to FIG. 16, at block 1010, an output voltage of the Buck converter is divided to generate a feedback voltage. At block 1020, the feedback voltage is sent to a first input terminal of a comparator. At block 1030, the feedback voltage and a reference voltage are sent to a first input terminal of a transconductance amplifier and a second input terminal of the transconductance amplifier, respectively. At block 1040, a compensation ramp voltage is generated using a ramp signal generator, comprising: generating a ramp voltage using a ramp circuit of the ramp signal generator; and adding the ramp voltage to a first voltage at an output terminal of the transconductance amplifier. At block 1050, the compensation ramp voltage is sent to a second input terminal of the comparator. At block 1060, a pulse generator generates a pulse signal comprising pulses that correspond to rising edges in an output signal of the comparator. At block 1070, the Buck converter is switched using a switching control signal derived from the pulse signal.

Embodiments may achieve advantages as described below. For example, the disclosed control circuit for the COT Buck converter does not require direct information of the output voltage and switching frequency, thereby reducing the number of pins needed for the IC device 110 that integrates the Buck converter and the control circuit. A combination of the output voltage and switching frequency is supplied to the pin $R_{RON}$ of the IC device 110 to determine the pulse width of the $T_{ON}$ signal. In the feedback path, besides the voltage divider, only a non-dissipative capacitor $C_{FF}$ (which is optional) is used, which reduces power consumption and improves the power efficiency of the Buck converter. In addition, the control circuit of the Buck converter performs stability control through two feedback paths: a fast path that provides a feedback voltage $V_{FB}$ directly to the PWM comparator 121, and a slow path that achieves better accuracy by providing a new set point for the PWM comparator 121. The compensation ramp voltages generated by the disclosed ramp signal generators achieves stability of the Buck converter over a wide range of output voltage ripple and switching frequency.

Examples of the present invention are summarized here. Other examples can also be understood from the entirety of the specification and the claims filed herein.

Example 1. In accordance with an embodiment, a switched-mode power supply (SMPS) includes: a Buck converter; and a control circuit for the Buck converter, comprising: a comparator configured to compare a feedback voltage of the Buck converter with a compensation ramp voltage; a pulse generator coupled to an output terminal of the comparator and configured to generate a pulse signal in response to a rising edge in an output signal of the comparator; a logic circuit coupled to an output terminal of the pulse generator and configured to generate, based on the pulse signal, a switching control signal that controls switching of the Buck converter; a transconductance amplifier, wherein a first input terminal of the transconductance amplifier is configured to receive the feedback voltage, and a second input terminal of the transconductance amplifier is configured to receive a reference voltage; a first capacitor coupled between an output terminal of the transconductance amplifier and a reference voltage node; and a ramp signal generator configured to generate the compensation ramp voltage by adding a first voltage at the output terminal of the transconductance amplifier and a ramp voltage generated by a ramp circuit of the ramp signal generator.

Example 2. The SMPS of Example 1, wherein the ramp voltage is a non-linear voltage signal.

Example 3. The SMPS of Example 2, wherein in a switching period of the Buck converter, a gradient of the non-linear voltage signal decreases continuously from a beginning of the non-linear voltage signal to an end of the non-linear voltage signal.

Example 4. The SMPS of Example 3, further comprising an edge detector coupled between the logic circuit and the ramp signal generator, wherein the edge detector is configured to generate a control signal for the ramp signal generator by detecting a rising edge in the switching control signal.

Example 5. The SMPS of Example 3, wherein at a time instant $t_x$ within the switching period of the Buck converter, the non-linear voltage signal has a gradient $S_x$, wherein a product between $t_x$ and $S_x$ remain the same over a plurality of time instants within the duration of the non-linear voltage signal.

Example 6. The SMPS of Example 3, wherein pulses in the pulse signal have a fixed pulse width.

Example 7. The SMPS of Example 3, wherein at a time instant $t_x$ within the switching period, a corresponding gradient of the non-linear voltage signal at the time instant $t_x$ is equal to or larger than $S_x$, where $S_x = K \times \Delta V_{out}/t_x$, $\Delta V_{out}$ is the Buck converter's output voltage ripple, and K is a constant value.

Example 8. The SMPS of Example 1, wherein the switching control signal comprises a high-side switching signal and a lower-side switching signal for controlling switching of a high-side switch of the Buck converter and a low-side switch of the Buck converter, respectively.

Example 9. The SMPS of Example 1, wherein the ramp signal generator comprises: a current source configured to provide a supply current; an operational amplifier, wherein a non-inverting input terminal of the operational amplifier is coupled to the output terminal of the transconductance amplifier, and an inverting input terminal of the operational amplifier is coupled to an output terminal of the operational amplifier; the ramp circuit coupled between an output terminal of the current source and the output terminal of the operational amplifier, wherein a voltage at the output terminal of the current source is the compensation ramp voltage; and a switch coupled in parallel with the ramp circuit, wherein the switch is configured to be closed for a period of time at a beginning of a switching period of the Buck converter.

Example 10. The SMPS of Example 9, wherein the supply current has a constant current value, wherein the ramp circuit comprises: a resistor coupled between the output terminal of the current source and the output terminal of the operational amplifier; and a second capacitor coupled in parallel with the resistor.

Example 11. The SMPS of Example 9, wherein the supply current has a current value that decreases linearly over time, wherein the ramp circuit comprises a capacitor coupled between the output terminal of the current source and the output terminal of the operational amplifier.

Example 12. The SMPS of Example 9, wherein the supply current has a current value that decreases over time, and a time plot of the current value of the supply current has a hyperbola shape, wherein the ramp circuit comprise a capacitor coupled between the output terminal of the current source and the output terminal of the operational amplifier.

Example 13. In accordance with an embodiment, an integrated circuit (IC) device includes: one or more switches of a Buck converter; and a control circuit for the Buck converter, comprising: a comparator configured to generate a comparator output signal by comparing a feedback voltage of the Buck converter with a compensation ramp voltage; a pulse generator configured to generate a pulse signal in response to a rising edge in the comparator output signal, wherein the Buck converter is configured to be controlled by a switching control signal derived from the pulse signal; a transconductance amplifier configured to generate, at an output terminal of the transconductance amplifier, a current proportional to a difference between a reference voltage and the feedback voltage; a first capacitor coupled between the output terminal of the transconductance amplifier and a reference voltage node; and a ramp signal generator configured to generate the compensation ramp voltage by adding a first voltage at the output terminal of the transconductance amplifier and a ramp voltage generated by a ramp circuit of the ramp signal generator.

Example 14. The IC device of Example 13, wherein the ramp voltage is a non-linear voltage signal, wherein in a switching period of the Buck converter, a gradient of the non-linear voltage signal decreases continuously from a start of the switching period to an end of the switching period.

Example 15. The IC device of Example 14, wherein the pulse signal has a fixed pulse width.

Example 16. The IC device of Example 14, wherein at a time instant $t_x$ within the switching period, a corresponding gradient of the non-linear voltage signal at the time instant $t_x$ is equal to or larger than $S_x$, where $S_x = K \times \Delta V_{out}/t_x$, $\Delta V_{out}$ is the Buck converter's output voltage ripple, and K is a constant value.

Example 17. The IC device of Example 16, wherein the pulse generator is coupled to a pin of the IC device, wherein the pin is configured to be coupled to a resistor having a resistance $R = K_{RON} \times V_{OUT}/f_{SW}$, where $V_{OUT}$ is a target output voltage of the Buck converter, $f_{SW}$ is a target switching frequency of the Buck converter, and $K_{RON}$ is a constant.

Example 18. In accordance with an embodiment, a method of operating a Buck converter includes: dividing an output voltage of the Buck converter to generate a feedback voltage; sending the feedback voltage to a first input terminal of a comparator; sending the feedback voltage and a reference voltage to a first input terminal of a transconductance amplifier and a second input terminal of the transconductance amplifier, respectively; and generating a compensation ramp voltage using a ramp signal generator, comprising: generating a ramp voltage using a ramp circuit of the ramp signal generator; and adding the ramp voltage to a first voltage at an output terminal of the transconductance amplifier. The method further includes: sending the compensation ramp voltage to a second input terminal of the comparator; generating, using a pulse generator, a pulse signal comprising pulses that correspond to rising edges in an output signal of the comparator; and switching the Buck converter using a switching control signal derived from the pulse signal.

Example 19. The method of Example 18, wherein the pulse signal is generated to have a fixed pule width.

Example 20. The method of Example 19, wherein the ramp voltage is generated to be a non-linear voltage signal, wherein in a switching period of the Buck converter, a gradient of the non-linear voltage signal decreases continuously from a start of the switching period to an end of the switching period.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A switched-mode power supply (SMPS) comprising:
a Buck converter; and
a control circuit for the Buck converter, comprising:
    a comparator configured to compare a feedback voltage of the Buck converter with a compensation ramp voltage, wherein a non-inverting input terminal of the comparator is configured to be coupled to the compensation ramp voltage, and an inverting input terminal of the comparator is configured to be coupled to the feedback voltage;
    a pulse generator coupled to an output terminal of the comparator and configured to generate a pulse signal in response to a rising edge in an output signal of the comparator;

a logic circuit coupled to an output terminal of the pulse generator and configured to generate, based on the pulse signal, a switching control signal that controls switching of the Buck converter;
    a transconductance amplifier, wherein a first input terminal of the transconductance amplifier is configured to receive the feedback voltage, and a second input terminal of the transconductance amplifier is configured to receive a reference voltage;
    a first capacitor coupled between an output terminal of the transconductance amplifier and a reference voltage node; and
    a ramp signal generator configured to generate the compensation ramp voltage by adding a first voltage at the output terminal of the transconductance amplifier and a ramp voltage generated by a ramp circuit of the ramp signal generator, wherein the ramp voltage is a non-linear voltage signal, wherein in a switching period of the Buck converter, a gradient of the non-linear voltage signal decreases continuously from a beginning of the non-linear voltage signal to an end of the non-linear voltage signal.

2. The SMPS of claim 1, further comprising an edge detector coupled between the logic circuit and the ramp signal generator, wherein the edge detector is configured to generate a control signal for the ramp signal generator by detecting a rising edge in the switching control signal.

3. The SMPS of claim 1, wherein at a time instant $t_x$ within the switching period of the Buck converter, the non-linear voltage signal has a gradient $S_x$, wherein a product between $t_x$ and $S_x$ remains a same over a plurality of time instants within a duration of the non-linear voltage signal.

4. The SMPS of claim 1, wherein pulses in the pulse signal have a fixed pulse width.

5. The SMPS of claim 1, wherein at a time instant $t_x$ within the switching period, a corresponding gradient of the non-linear voltage signal at the time instant $t_x$ is equal to or larger than a gradient $S_x$, where $$S_x = K \times \frac{\Delta V_{out}}{t_x},$$

$\Delta V_{out}$ is the Buck converter's output voltage ripple, and K is a constant value.

6. The SMPS of claim 1, wherein the switching control signal comprises a high-side switching signal and a low-side switching signal for controlling switching of a high-side switch of the Buck converter and a low-side switch of the Buck converter, respectively.

7. The SMPS of claim 1, wherein the ramp signal generator comprises:
    a current source configured to provide a supply current;
    an operational amplifier, wherein a non-inverting input terminal of the operational amplifier is coupled to the output terminal of the transconductance amplifier, and an inverting input terminal of the operational amplifier is coupled to an output terminal of the operational amplifier;
    the ramp circuit coupled between an output terminal of the current source and the output terminal of the operational amplifier, wherein a voltage at the output terminal of the current source is the compensation ramp voltage; and a switch coupled in parallel with the ramp circuit, wherein the switch is configured to be closed for a period of time at a beginning of the switching period of the Buck converter.

8. The SMPS of claim 7, wherein the supply current has a constant current value, wherein the ramp circuit comprises:

a resistor coupled between the output terminal of the current source and the output terminal of the operational amplifier; and a second capacitor coupled in parallel with the resistor.

9. The SMPS of claim 7, wherein the supply current has a current value that decreases linearly over time, wherein the ramp circuit comprises a capacitor coupled between the output terminal of the current source and the output terminal of the operational amplifier.

10. The SMPS of claim 7, wherein the supply current has a current value that decreases over time, and a time plot of the current value of the supply current has a hyperbola shape, wherein the ramp circuit comprises a capacitor coupled between the output terminal of the current source and the output terminal of the operational amplifier.

11. An integrated circuit (IC) device comprising:

one or more switches of a Buck converter; and a control circuit for the Buck converter, comprising:

a comparator configured to generate a comparator output signal by comparing a feedback voltage of the Buck converter with a compensation ramp voltage, wherein an inverting input terminal of the comparator is configured to be coupled to the feedback voltage, and a non-inverting input terminal of the comparator is configured to be coupled to the compensation ramp voltage;

a pulse generator configured to generate a pulse signal in response to a rising edge in the comparator output signal, wherein the Buck converter is configured to be controlled by a switching control signal derived from the pulse signal;

a transconductance amplifier configured to generate, at an output terminal of the transconductance amplifier, a current proportional to a difference between a reference voltage and the feedback voltage;

a first capacitor coupled between the output terminal of the transconductance amplifier and a reference voltage node; and a ramp signal generator configured to generate the compensation ramp voltage by adding a first voltage at the output terminal of the transconductance amplifier and a ramp voltage generated by a ramp circuit of the ramp signal generator, wherein the ramp voltage is a non-linear voltage signal, wherein in a switching period of the Buck converter, a gradient of the non-linear voltage signal decreases continuously from a start of the switching period to an end of the switching period.

12. The IC device of claim 11, wherein the pulse signal has a fixed pulse width.

13. The IC device of claim 11, wherein at a time instant $t_x$ within the switching period, a corresponding gradient of the non-linear voltage signal at the time instant $t_x$ is equal to or larger than a gradient $S_x$, where $$S_x = K \times \frac{\Delta V_{out}}{t_x},$$

$\Delta V_{out}$ is the Buck converter's output voltage ripple, and K is a constant value.

14. The IC device of claim 13, wherein the pulse generator is coupled to a pin of the IC device, wherein the pin is configured to be coupled to a resistor having a resistance $$R = K_{RON} \times \frac{V_{OUT}}{f_{SM}},$$

where $V_{OUT}$ is a target output voltage of the Buck converter, $f_{SW}$ is a target switching frequency of the Buck converter, and $K_{RON}$ is a constant.

15. A method of operating a Buck converter, the method comprising:

dividing an output voltage of the Buck converter to generate a feedback voltage;

sending the feedback voltage to an inverting input terminal of a comparator;

sending the feedback voltage and a reference voltage to a first input terminal of a transconductance amplifier and a second input terminal of the transconductance amplifier, respectively;

generating a compensation ramp voltage using a ramp signal generator, comprising:

generating a ramp voltage using a ramp circuit of the ramp signal generator, wherein the ramp voltage is generated to be a non-linear voltage signal, wherein in a switching period of the Buck converter, a gradient of the non-linear voltage signal decreases continuously from a start of the switching period to an end of the switching period; and adding the ramp voltage to a first voltage at an output terminal of the transconductance amplifier;

sending the compensation ramp voltage to a non-inverting input terminal of the comparator;

generating, using a pulse generator, a pulse signal comprising pulses that correspond to rising edges in an output signal of the comparator; and switching the Buck converter using a switching control signal derived from the pulse signal.

16. The method of claim 15, wherein the pulse signal is generated to have a fixed pulse width.

* * * * *